United States Patent
Endoh

(10) Patent No.: US 9,098,756 B2
(45) Date of Patent: Aug. 4, 2015

(54) BIOMETRIC AUTHENTICATION DEVICE AND ADJUSTMENT METHOD FOR POSITION OF HAND OF USER IN BIOMETRIC AUTHENTICATION DEVICE

(75) Inventor: Toshio Endoh, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 426 days.

(21) Appl. No.: 13/454,465

(22) Filed: Apr. 24, 2012

(65) Prior Publication Data

US 2013/0027184 A1 Jan. 31, 2013

(30) Foreign Application Priority Data

Jul. 29, 2011 (JP) ................. 2011-167223

(51) Int. Cl.
*G06F 7/04* (2006.01)
*G06K 9/00* (2006.01)
*G06K 9/03* (2006.01)

(52) U.S. Cl.
CPC ........ *G06K 9/00919* (2013.01); *G06K 9/00013* (2013.01); *G06K 9/00892* (2013.01); *G06K 9/00912* (2013.01); *G06K 9/03* (2013.01)

(58) Field of Classification Search
CPC G07C 9/00087; G07C 9/00158; G06F 21/32; G06K 9/00013; G06K 9/00892; G06K 9/03; G06K 9/00919; G06K 9/00912
USPC ................................. 340/5.8, 5.81, 5.82, 5.83
See application file for complete search history.

(56) References Cited

U.S. PATENT DOCUMENTS

| | | | |
|---|---|---|---|
| 7,031,502 B1 | 4/2006 | Mil'shtein et al. | |
| 2006/0182318 A1* | 8/2006 | Shigeta | 382/124 |
| 2008/0247614 A1* | 10/2008 | Abiko | 382/124 |
| 2009/0123041 A1* | 5/2009 | Tani | 382/126 |

FOREIGN PATENT DOCUMENTS

| | | |
|---|---|---|
| JP | 2000-268174 | 9/2000 |
| JP | 2006-277341 | 10/2006 |

(Continued)

OTHER PUBLICATIONS

Ross et al., "Information Fusion in Biometrics", Pattern Recognition Letters, Elsevier, Amsterdam, NL, vol. 24, No. 13, Sep. 1, 2003, pp. 2115-2125.

(Continued)

*Primary Examiner* — Jennifer Mehmood
*Assistant Examiner* — Yong Hang Jiang
(74) *Attorney, Agent, or Firm* — Staas & Halsey LLP

(57) ABSTRACT

A biometric authentication device determining whether or not a user is to be authenticated, by matching biological information of a finger of the user and biological information of a palm thereof against biological information of a finger of a registered user and biological information of a palm thereof, the biometric authentication device includes, a first sensor configured to generate a first biological image in which the biological information of the finger of the user is captured; a second sensor configured to generate a second biological image in which the biological information of the palm of the user is captured; a guiding member configured to regulate a position of the finger of the user; an object area detection unit configured to detect a first object area in which the biological information of the finger is captured on the first biological image; and a position determination unit configured to determine.

6 Claims, 13 Drawing Sheets

(56) References Cited

FOREIGN PATENT DOCUMENTS

| JP | 2007-58643 | 3/2007 |
|---|---|---|
| JP | 2007-280298 | 10/2007 |
| JP | 2007-287077 | 11/2007 |
| JP | 2008-54747 | 3/2008 |
| WO | WO 2004/021884 A1 | 3/2004 |

OTHER PUBLICATIONS

Extended European Search Report dated Oct. 17, 2012 in European Application No. 12166351.2-1247.
Japanese Office Action mailed Feb. 10, 2015 in related Japanese Application No. 2011-167223.

* cited by examiner

BIOMETRIC AUTHENTICATION DEVICE AND ADJUSTMENT METHOD FOR POSITION OF HAND OF USER IN BIOMETRIC AUTHENTICATION DEVICE

CROSS-REFERENCE TO RELATED APPLICATION(S)

This application is based upon and claims the benefit of priority of the prior Japanese Patent Application No. 2011-167223, filed on Jul. 29, 2011, the entire contents of which are incorporated herein by reference.

FIELD

The embodiments discussed herein are related to a biometric authentication device performing biometric authentication on the basis of biological information included by each of a plurality of regions and a method for adjusting the positions of the plural regions including the biological information, with respect to a sensor reading the biological information.

BACKGROUND

In recent years, there has been developed a biometric authentication technique in which, on the basis of a biological image expressing biological information such as the pattern of the vein of a hand or a finger, a fingerprint, a palm print, or the like, the user of a device or a system is authenticated. For example, a biometric authentication device utilizing such a biometric authentication technique acquires, as an input biological image, a biological image expressing the biological information of a user that intends to use the biometric authentication device. In addition, the biometric authentication device matches the input biological information of the user, expressed in the input biological image, against registration biological information serving as biological information expressed in the preliminarily registered biological image of a registered user. When, on the basis of the result of the matching processing, having determined that the input biological information matches the registration biological information, the biometric authentication device authenticates the user as a registered user having a valid authority. In addition, the biometric authentication device allows the authenticated user to use a device, into which the biometric authentication device is incorporated, or another device connected to the biometric authentication device.

In order to enhance authentication accuracy, it is desirable that the direction of the input biological information on the input biological image is headed in a preliminarily defined direction and a region including the biological information is adequately disposed with respect to a sensor so the whole input biological information is captured in the input biological image. Therefore, for example, in Japanese Laid-open Patent Publication No. 2000-268174 or International Publication Pamphlet No. WO 2004/21884, there has been disclosed a technique in which a guide used for adequately disposing a region including biological information is provided. In addition, in International Publication Pamphlet No. WO 2004/21884, there has been disclosed a technique in which, from an image in which a region including biological information is captured, the position or direction of the region is detected and when it is inadequate to correct the image of the biological information on the basis of the detected position or direction, a user is notified of that effect. Furthermore, in Japanese Laid-open Patent Publication No. 2007-58643, there has been disclosed a finger vein pattern input device that includes a finger tip portion rest, equipped with a fingertip guide, and a finger base portion rest and in which the finger tip portion rest is slidable in the direction of the finger base portion rest along the internal wall surface of a main body. When a user has moved a finger along with the finger tip portion rest and hence the finger has reached an adequate position, this finger vein pattern input device takes an image of the vein pattern of the finger.

SUMMARY

According to an aspect of the embodiments, a biometric authentication device determining whether or not a user is to be authenticated, by matching biological information of a finger of the user and biological information of a palm thereof against biological information of a finger of a registered user and biological information of a palm thereof, the biometric authentication device includes, a first sensor configured to generate a first biological image in which the biological information of the finger of the user is captured; a second sensor configured to generate a second biological image in which the biological information of the palm of the user is captured; a guiding member configured to regulate a position of the finger of the user; an object area detection unit configured to detect a first object area in which the biological information of the finger is captured on the first biological image; and a position determination unit configured to determine, on the basis of the first object area, whether or not at least a portion of the biological information of the finger falls outside an imaging range of the first sensor, and obtain, on the basis of a positional relationship between the guiding member and the biological information of the finger estimated from the first object area, a moving direction of a hand of the user, used for causing the biological information of the finger to fall inside the imaging range of the first sensor and causing the biological information of the palm to fall inside an imaging range of the second sensor, when at least a portion of the biological information of the finger falls outside the imaging range of the first sensor.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which.

DESCRIPTION OF EMBODIMENTS

Hereinafter, a biometric authentication device according to various embodiments will be described with reference to drawings.

This biometric authentication device includes at least two sensors. In addition, this biometric authentication device reads biological information included in a finger using one sensor, thereby generating a first biological image in which the biological information of the finger is captured, and reads biological information included in a palm using the other sensor, thereby generating a second biological image in which the biological information of the palm is captured. Furthermore, this biometric authentication device includes a guiding member used for regulating the position of the hand of a user and guiding the finger and the palm to adequate positions with respect to each sensor. In addition, this biometric authentication device estimates a positional relationship among the guiding member, the finger, and the palm by analyzing the first and second biological images, and hence estimates the moving direction of the finger or the palm so that the positions of the finger and the palm are adequately located with respect to the individual sensors. Furthermore, in order to move the finger or the palm along the estimated moving direction, this biometric authentication device adjusts the position of the guiding member or instructs the user on the moving direction of the hand.

In the present embodiment, a fingerprint is used as the biological information of the finger to be the target of biometric authentication, and a vein pattern is used as the biological information of the palm. However, the biological information of the finger may also be a vein pattern, or the biological information of the palm may also be a palm print.

In addition, in the present application, the term "matching processing" is used for indicating processing for calculating the degree of similarity expressing the level of similarity between the biological information of the user and the biological information of a registered user. In addition, the term "biometric authentication processing" is used for indicating entire authentication processing including not only the matching processing but also processing for determining whether or not the user is to be authenticated, using the result of the matching processing.

Figure 1:
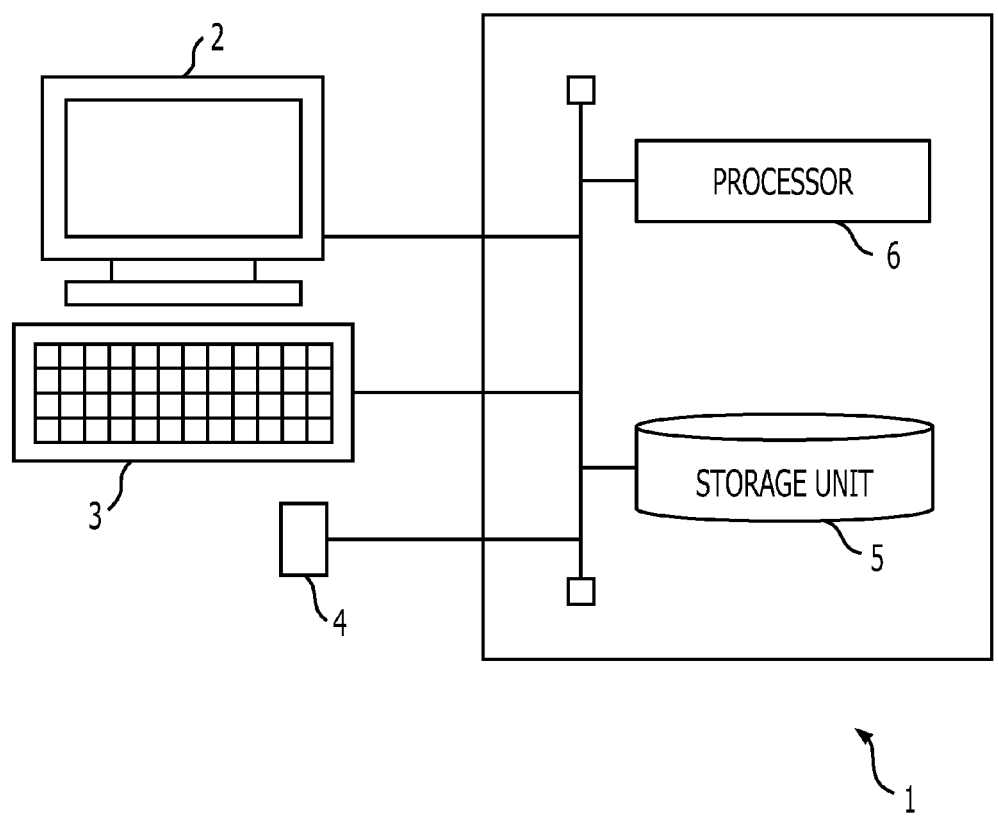
FIG. 1 is a schematic configuration diagram of a biometric authentication device according to a first or second embodiment.

FIG. 1 illustrates the schematic configuration diagram of a biometric authentication device. As illustrated in FIG. 1, a biometric authentication device 1 includes a display unit 2, an input unit 3, a biological information acquisition unit 4, a storage unit 5, and a processor 6. The display unit 2, the input unit 3, and the biological information acquisition unit 4 may also be provided independently from the main body of the biometric authentication device accommodating the storage unit 5 and the processor 6. Alternatively, the display unit 2, the input unit 3, the biological information acquisition unit 4, the storage unit 5, and the processor 6 may also be accommodated in one housing.

The biometric authentication device 1 generates a first biological image expressing the fingerprint of the finger of a user and a second biological image expressing the vein pattern of a palm owing to the biological information acquisition unit 4, and executes biometric authentication processing using these biological images. In addition, when, as a result of the biometric authentication processing, the user is authenticated as one of registered users, the biometric authentication device 1 allows the user to use a device in which the biometric authentication device 1 is mounted. Alternatively, the biometric authentication device 1 transmits a signal indicating that the user has been authenticated, to another device not illustrated, and allows the user to use the other device.

For example, the display unit 2 includes a display device such as a liquid crystal display, a CRT monitor, or the like. In addition, for example, the display unit 2 displays, to the user, a message indicating a region (a right hand or a left hand) to be used for matching, a guidance message used for causing a hand to be disposed in a position at which the biological information acquisition unit 4 can acquire an adequate biological image, or an authentication result. In addition, the display unit 2 displays various kinds of information relating to an application executed by the processor 6.

For example, the input unit 3 includes a keyboard. In addition, through the input unit 3, a command, data, and a user name or password serving as the identification information of the user, which have been input by the user, are provided to the processor 6.

The biological information acquisition unit 4 generates the first biological image expressing the fingerprints of a plurality of fingers of the user and the second biological image expressing the vein pattern of the palm of the user.

Figure 2A:
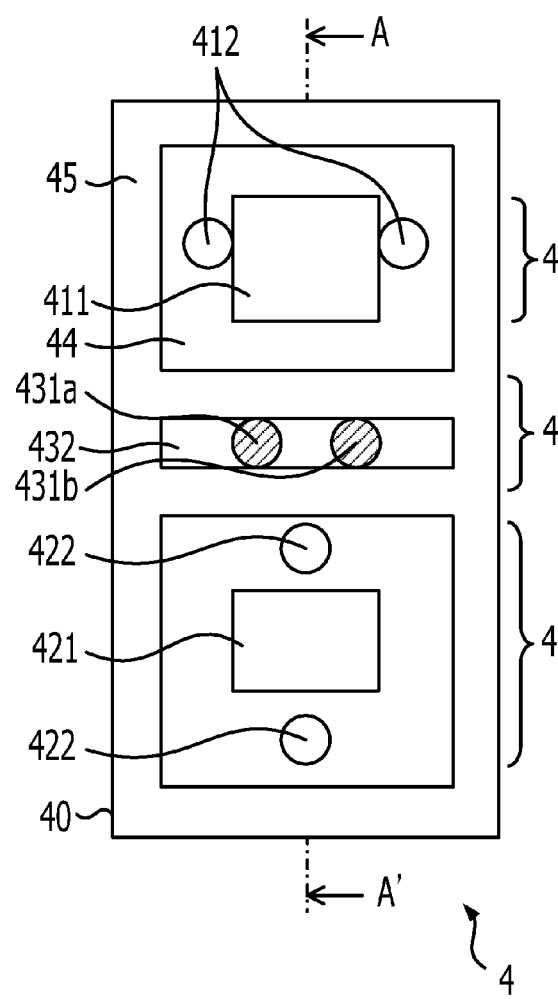
FIG. 2A is a schematic plan view of a biological information acquisition unit.
Figure 2B:
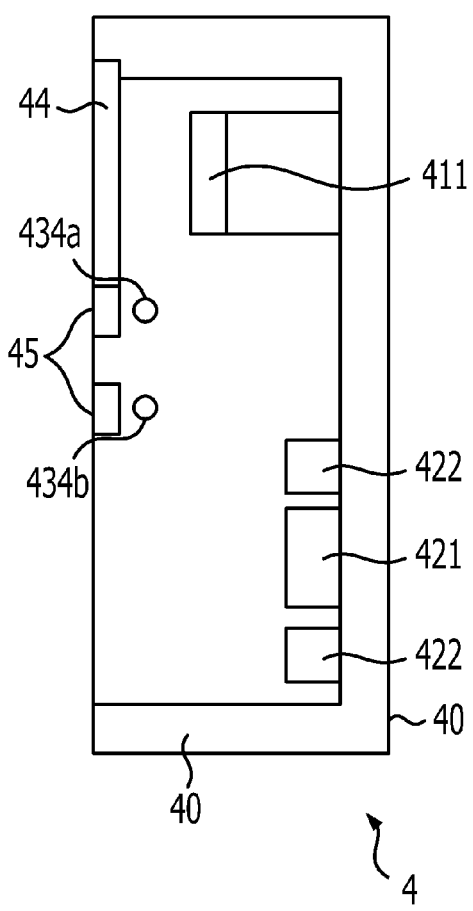
FIG. 2B is a schematic side cross-sectional view in a view AA' in FIG. 2A.

FIG. 2A is the schematic plan view of the biological information acquisition unit 4, and FIG. 2B is a schematic side cross-sectional view in a view AA' in FIG. 2A.

The biological information acquisition unit 4 includes a fingerprint sensor 41 and a vein sensor 42. In addition, each of the fingerprint sensor 41 and the vein sensor 42 is disposed within a rectangular parallelepiped-shaped housing 40, formed using resin or metal, so that the sensor surface thereof is headed in an upward direction. Furthermore, in relation to the user, the vein sensor 42 is disposed on a near side, and the fingerprint sensor 41 is disposed on a far side. Accordingly, in order to generate the first and second biological images, with the back of the hand facing upward, the user places the finger above the fingerprint sensor 41 and places the palm above the vein sensor 42.

For example, the fingerprint sensor 41 includes an area sensor 411 in which solid-state imaging elements are disposed in a two-dimensional manner and that is capable of simultaneously taking an image of a plurality of fingers, and the fingerprint sensor 41 is an optical fingerprint sensor based on a light-path separation method. This area sensor 411 is disposed immediately beneath a transparent protective cover 44, formed using glass or resin and disposed on the top surface of the biological information acquisition unit 4. In addition, around the protective cover 44, an opaque top surface cover 45 formed using resin or metal is provided. In addition, within the housing 40, an illumination light source 412 is included that is used for illuminating, from below, the finger placed on the protective cover 44. For example, such an illumination light source 412 may be a light-emitting diode emitting light including a visible light wavelength. In addition, for example, by focusing, on the area sensor 411, the light emitted from the illumination light source and reflected from the front surface of the finger, using an imaging optics system (not illustrated), the fingerprint sensor 41 takes an image of the fingerprint of the finger placed on the protective cover 44, and generates the first biological image in which the image of the fingerprint is captured. For example, the value of each pixel in the first biological image is a value ranging from 0 to 255, and the pixel value thereof increases with an increase in the luminance of the pixel. In the present embodiment, in the first biological image, a ridge line is bright, and a valley line is dark. Namely, the value of a pixel in which the ridge line is captured is relatively large, and the value of a pixel in which the valley line is captured is relatively small. In addition, the fingerprint sensor 41 may also be a sensor based on another optical method such as a total reflection optical method or another principle such as an electric field method, a pressure-sensitive method, or an ultrasonic method. When the sensor based on the other principle is used, the ridge line is dark and the valley line is bright on the first biological image in some cases.

In the present embodiment, the fingerprint sensor 41 takes an image of the fingerprints of an index finger, a middle finger, and an annular finger.

On the other hand, for example, the vein sensor 42 includes an area sensor 421 in which solid-state imaging elements such as charge coupled devices are disposed in a two-dimensional manner and that has a sensitivity for infrared light. Furthermore, the vein sensor 42 includes an illumination light source 422 such as an infrared light-emitting diode emitting the infrared light or the like, so as to illuminate the hand of the user. In addition, the area sensor 421 is disposed in the bottom portion of the housing 40 so as not to be touched with the hand of the user. In addition, around the vein sensor 42, the side wall of the housing 40 is formed, and it is possible for a portion of the palm of the user to be placed on the upper end of the side wall. In addition, the upper end of the side wall and the top surface of the protective cover 44 are approximately parallel to each other. Therefore, when the user places the finger on the protective cover 44 and places a portion of the palm on the upper end of the side wall, the finger and the palm of the user turn out to be approximately parallel to each other. In addition, the top surface of the housing 40 is formed so that the upper portion of the vein sensor 42 becomes hollowed out. In addition, an imaging optics system (not illustrated) included in the vein sensor 42 focuses, on the area sensor 421, the image of the vein pattern of the palm located in the hollow portion. In addition, the area sensor 421 generates the second biological image in which the vein pattern is captured. For example, the value of each pixel in the second biological image is a value ranging from 0 to 255, and the pixel value thereof increases with an increase in the luminance of the pixel. In the present embodiment, in the second biological image, an area in which a vein is captured and a portion in which the hand is not captured are dark, and an area in which a portion of the hand is captured without a vein is bright.

In the present embodiment, in both of the first biological image and the second biological image, when drawing nearer to the upper end of the biological image, a region nearer to the tip of the finger is captured, and when drawing nearer to the lower end of the biological image, a region nearer to a wrist is captured.

In addition, between the fingerprint sensor 41 and the vein sensor 42, a guide mechanism 43 is disposed.

Figure 3A:
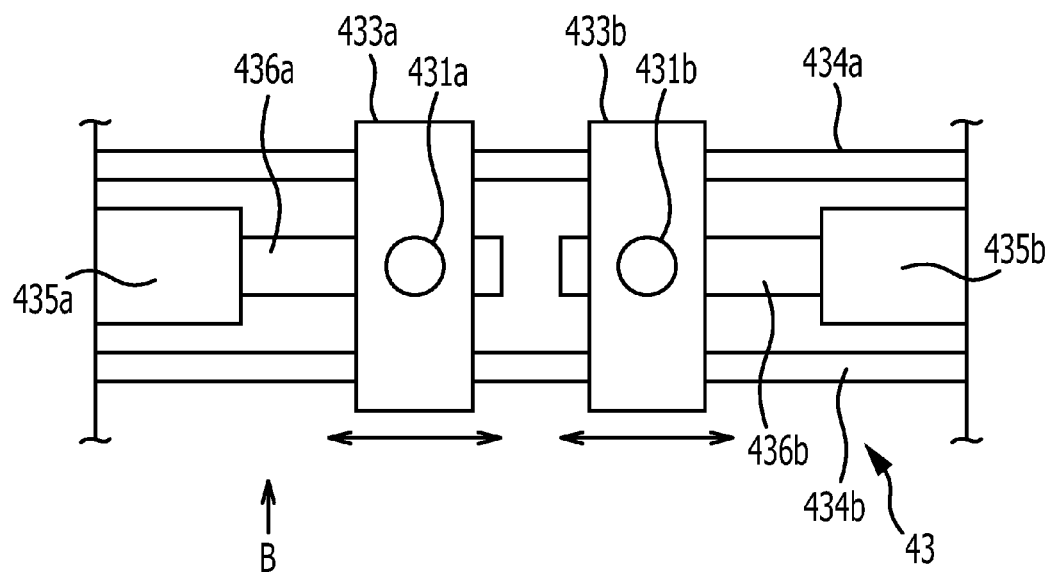
FIG. 3A is a schematic plan view of a guide mechanism.
Figure 3B:
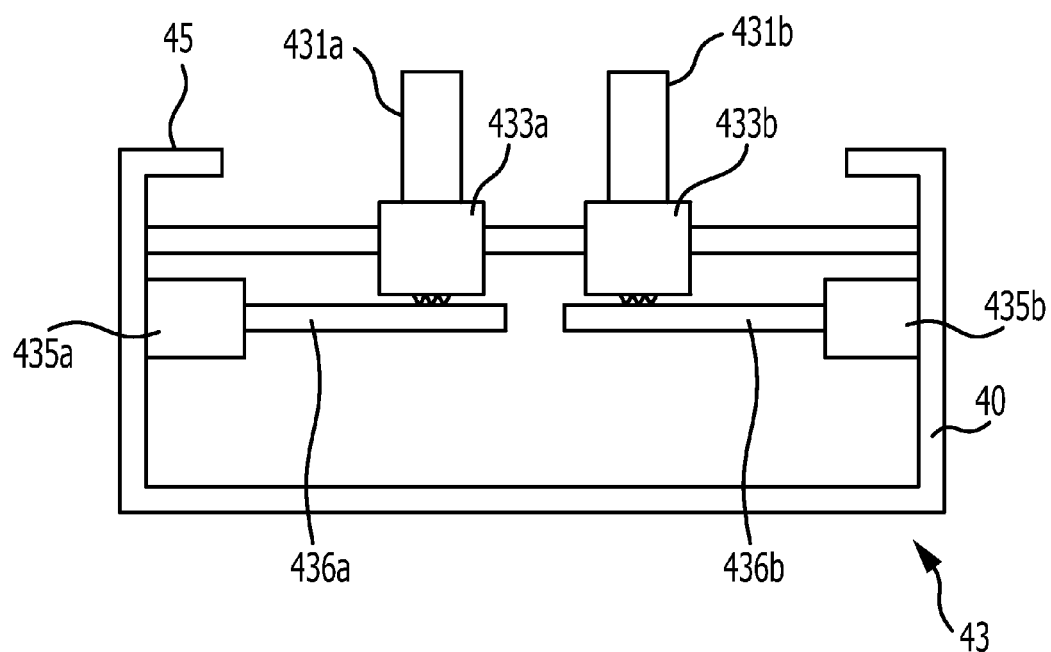
FIG. 3B is a schematic side view of the guide mechanism viewed from the direction of an arrow B in FIG. 3A.

FIG. 3A is the schematic plan view of the guide mechanism 43, and FIG. 3B is the schematic side view of the guide mechanism 43 viewed from the direction of an arrow B in FIG. 3A. As illustrated in FIG. 2A, FIG. 2B, FIG. 3A, and FIG. 3B, the guide mechanism 43 includes two rod-shaped pins 431a and 431b formed using wood, resin, or metal and disposed so as to project upward from the top surface cover of the housing 40 in an approximately vertical direction. The pins 431a and 431b correspond to an example of a guiding member regulating the position of the hand of the user. In the present embodiment, the pins 431a and 431b are disposed so that when the user having a standard-sized hand places the hand in an adequate position, the pin 431a is sandwiched in between the vicinities of the bases of the index finger and the middle finger and the pin 431b is sandwiched in between the vicinities of the bases of the middle finger and the annular finger. In addition, while the above description has been performed with a right being cited as an example, in the case of a left hand, a correspondence relationship between pins and fingers is opposite to the case of the right hand. While, in the following description of the embodiment, the right hand will be described as an example, the biometric authentication device 1 also functions in the same way, in the case of the left hand.

Furthermore, when the user places the hand in an adequate position, each of the lower end of the pin 431a and the lower end of the pin 431b is inserted into a groove 432 formed in the top surface cover 45 of the housing 40, along a direction (hereinafter, for convenience sake, referred to as a lateral direction) perpendicular to a direction (hereinafter, for convenience sake, referred to as a longitudinal direction) headed from the hand of the user to the fingertips thereof. In addition, the lower end of the pin 431a and the lower end of the pin 431b are held by flat plate-like pin holding members 433a and 433b provided within the housing 40. Furthermore, down below the top surface cover 45 of the housing 40, two rails 434a and 434 are provided along the longitudinal direction of the groove 432. The rails 434a and 434b are slidably engaged to grooves formed in the vicinity of side ends on the far sides of the pin holding members 433a and 433b and grooves formed in the vicinity of side ends on the near sides thereof, respectively. Accordingly, along the longitudinal direction of the groove 432, the pin 431a is movable along with the pin holding member 433a. In the same way, along the longitudinal direction of the groove 432, the pin 431b is movable along with the pin holding member 433b. Therefore, it is possible to adjust a distance between the pin 431a and the pin 431b in response to the size of the hand of the user.

Furthermore, within the housing 40, two stepping motors 435a and 435b used for moving the pin 431a and the pin 431b and drive circuits (not illustrated) of the individual stepping motors are disposed. The stepping motors 435a and 435b are controlled by the processor 6.

The stepping motors 435a and 435b are disposed so that the rotation axis 436a of the stepping motor 435a and the rotation axis 436b of the stepping motor 435b are parallel to the longitudinal direction of the groove 432 and the leading end of the rotation axis 436a and the leading end of the rotation axis 436b face each other. In addition, a thread groove is formed in the rotation axis 436a, and this thread groove is engaged to a thread groove formed in the lower portion of the pin holding member 433a. Therefore, by a displacement amount corresponding to the rotation angle of the stepping motor 435a, the pin holding members 433a and the pin 431a are displaced along the longitudinal direction of the groove 432. In the same way, a thread groove is formed in the rotation axis 436b, and this thread groove is engaged to a thread groove formed in the lower portion of the pin holding member 433b. Therefore, by a displacement amount corresponding to the rotation angle of the stepping motor 435b, the pin holding members 433b and the pin 431b are displaced along the longitudinal direction of the groove 432.

Figure 4:
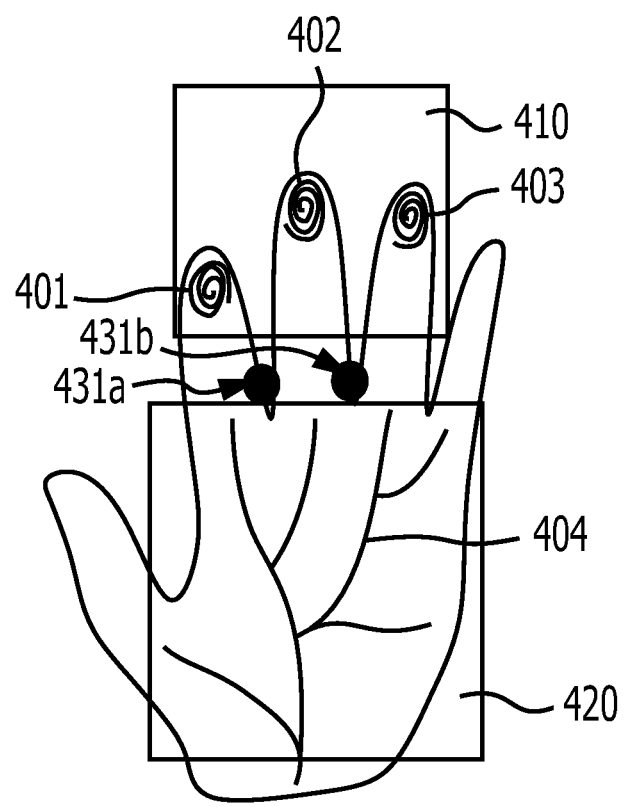
FIG. 4 is a diagram illustrating a positional relationship between imaging ranges of a fingerprint sensor and a vein sensor and two pins serving as a guiding member.

FIG. 4 is a diagram illustrating a positional relationship among the imaging ranges of the fingerprint sensor 41 and the vein sensor 42 and the two pins 431a and 431b serving as a guiding member. The user places the hand so as to sandwich the pin 431a between the vicinities of the bases of the index finger and the middle finger and sandwich the pin 431b between the vicinities of the bases of the middle finger and the annular finger. Accordingly, the fingerprints 401 to 403 of the individual fingers are included in the imaging range 410 of the fingerprint sensor 41, and the vein pattern 404 of the palm is included in the imaging range 420 of the vein sensor 42.

In the present embodiment, the biological information acquisition unit 4 is formed separately from the input unit 3. However, the biological information acquisition unit 4 may also be formed so as to be integrated with the input unit 3.

The first biological image and the second biological image generated by the biological information acquisition unit 4 are sent to the processor 6.

For example, the storage unit 5 includes at least one of a semiconductor memory, a magnetic disk device, and an optical disk device. In addition, the storage unit 5 stores therein an application program to be used in the biometric authentication device 1, the user name, the user identification number, and the personal setting information of at least one registered user, various kinds of data, and the like. In addition, the storage unit 5 stores therein a program used for executing the biometric authentication processing.

Furthermore, with respect to each registered user, the storage unit 5 stores therein matching-use data relating to the vein pattern of a right or left palm, which serves as the registration biological information of the registered user. For example, this matching-use data includes the position or type of a characteristic point, which expresses a characteristic structure such as the end point or branch point of a vein extracted from the second biological image generated at the time of the registration of the registered user. Alternatively, the matching-use data may also be the second biological image itself generated at the time of the registration of the registered user or a portion of the second biological image generated at the time of the registration thereof.

In addition, with respect to each registered user, the storage unit 5 stores therein matching-use data relating to the fingerprints of the index finger, the middle finger, and the annular finger of a right or left hand, which serves as the registration biological information of the registered user. For example, this matching-use data includes the position or type of a characteristic point, which expresses a characteristic structure such as the end point or branch point of a fingerprint extracted from the first biological image generated at the time of the registration of the registered user. Alternatively, the matching-use data relating to the fingerprint may also be the first biological image itself generated at the time of the registration of the registered user or a portion of the first biological image generated at the time of the registration thereof.

The processor 6 includes one processor or a plurality of processors and the peripheral circuit thereof. In addition, the processor 6 executes the biometric authentication processing utilizing the first and second biological images acquired from the biological information acquisition unit 4. In addition, the processor 6 executes registration processing for registering the biological information of the registered user.

Figure 5:
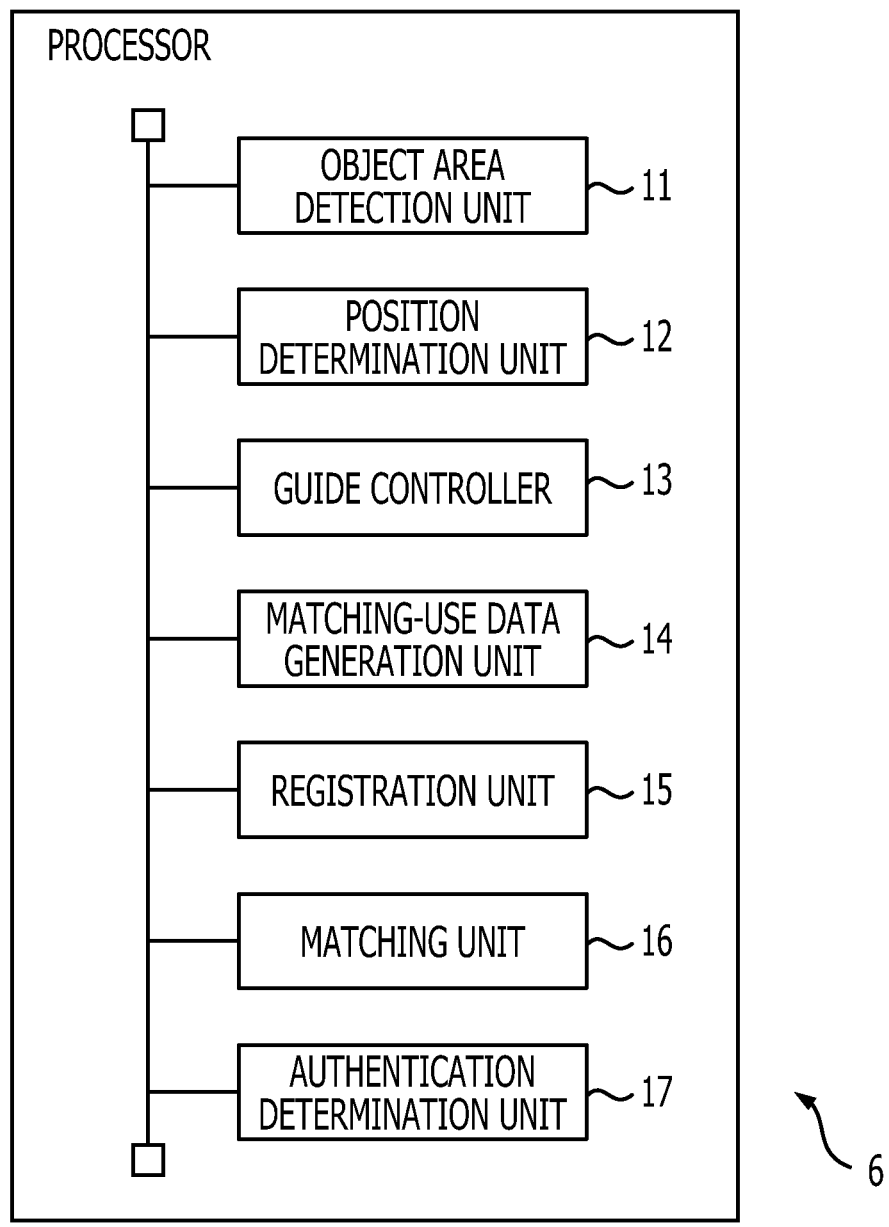
FIG. 5 is a functional block diagram of a processor.

FIG. 5 is the functional block diagram of the processor 6. As illustrated in FIG. 5, the processor 6 includes an object area detection unit 11, a position determination unit 12, a guide controller 13, a matching-use data generation unit 14, a registration unit 15, a matching unit 16, and an authentication determination unit 17. These individual units included in the processor 6 are functional modules implemented by a computer program executed on a processor included in the processor 6. Alternatively, these individual units included in the processor 6 may also be implemented, as firmware, into the biometric authentication device 1.

The object area detection unit 11, the position determination unit 12, the guide controller 13, and the matching-use data generation unit 14 are used at both of the time of the execution of the biometric authentication processing and the time of the execution of the registration processing. In addition, the registration unit 15 is used at the time of the execution of the registration processing. On the other hand, the matching unit 16 and the authentication determination unit 17 are used at the time of the execution of the biometric authentication processing.

From the first and second biological images, the object area detection unit 11 individually detects an object area serving as an area, in which the biological information that is an object is captured, and the base portion of the hand, used for position adjustment with respect to the guiding member.

With respect to the first biological image, for example, the object area detection unit 11 discriminates between a ridge line area serving as the set of pixels in which the ridge line of each finger is captured and a background area serving as the set of pixels in which the valley line thereof is captured and pixels in which the finger of the user is not captured, within the first biological image. In addition, the ridge line area is an example of the object area.

To that end, for example, the object area detection unit 11 binarizes the first biological image so that a pixel having a pixel value greater than or equal to a first binarization threshold value is included in the ridge line area and a pixel having a pixel value less than the first binarization threshold value is included in the background area. For example, the first binarization threshold value is set to a preliminarily set fixed value (for example, 100), the average pixel value within the first biological image, or a threshold value determined by subjecting, to discrimination analysis, pixel values included in the entire first biological image or a portion thereof. In addition, in the binarized first biological image, the values of pixels included in the ridge line area are set to "1", for example, and the values of pixels included in the background area are set to "0", for example.

In addition, in order to suppress the reduction of matching accuracy, it is desirable that the object area detection unit 11 removes, from the ridge line area, a portion located on a hand side, compared with the first joint of the finger. In the present embodiment, on the first biological image, individual fingers are captured so as to be aligned in the lateral direction. Therefore, for example, with respect to each row in the lateral direction in the first biological image, the object area detection unit 11 detects a portion in which there are successive areas having pixel values greater than or equal to a predetermined threshold value, as a biological area in which a finger is captured. On the first biological image, the value of a pixel in which no finger is captured is relatively small, and smaller than the value of a pixel in which the valley line is captured. Therefore, the predetermined threshold value is set to a value less than a pixel value corresponding to the valley line, for example, "10".

Starting from the upper end of the first biological image, in order, the object area detection unit 11 studies whether or not there are the successive biological areas between rows adjacent to each other. In addition, when there are the successive biological areas between rows adjacent to each other, the object area detection unit 11 links the successive biological areas with each other, as the biological area of one finger.

Alternatively, in order to obtain the biological area of each finger, the object area detection unit 11 may also add up the number of pixels included in the ridge line area in the binarized first biological image, with respect to each column. In addition, the object area detection unit 11 may also define, as a boundary between the biological areas of two fingers adjacent to each other, a column in which the number of pixels included in the ridge line area becomes a local minimal value.

Here, on the first biological image, the first joint becomes an area that has a length corresponding to the width of the finger along the lateral direction and in which there are successive pixels having pixel values corresponding to the valley line or pixel values darker than the valley line. In addition, when drawing nearer to the upper end of the first biological image, a region nearer to the tip of the finger is captured. Therefore, with respect to the biological area of each finger in the first biological image, the object area detection unit 11 defines, as an upper end, an uppermost row including the biological area of the finger, and in order, downward from the upper end, searches a row within the biological area, in which there are successive pixels that have pixel values less than or equal to the first binarization threshold value and correspond to a predetermined width. In addition, the object area detection unit 11 defines, as a first joint position, a row detected first. For example, with respect to each finger, the predetermined width is set to the average value of widths in the lateral direction in the biological area in which the finger is captured.

Every finger, with respect to the binarized first biological image, the object area detection unit 11 replaces, with the value of a pixel included in the background area, the value of a pixel located below the detected first joint position and included in the ridge line area.

Furthermore, for example, using the boundary of the biological area of each finger, the object area detection unit 11 sectionalizes the ridge line area so that the ridge line area corresponds to each finger, and hence obtains the ridge line area of each finger. In addition, the object area detection unit 11 assigns, to the ridge line area of each finger, an identification number indicating a corresponding finger.

The object area detection unit 11 temporarily stores, in the storage unit 5, the binarized first biological image, the position of a boundary between fingers adjacent to each other, and the identification number of each finger.

In addition, with respect to the second biological image, for example, the object area detection unit 11 discriminates between a biological area serving as the set of pixels in which the palm is captured and a background area serving as the set of pixels in which nothing is captured, within the second biological image. In the present embodiment, the value of a pixel included in the background area is lower than the value of a pixel included in the biological area. Therefore, for example, the object area detection unit 11 detects a pixel having a pixel value greater than or equal to a predetermined threshold value, and defines the set of the detected pixels as a biological area. For example, the predetermined threshold value is set to "10".

Furthermore, with respect to the biological area, the object area detection unit 11 discriminates between a vein area serving as the set of pixels in which a vein is captured and a non-vein area serving as the set of pixels in which no vein is captured. In addition, the vein area is an example of the object area. In the present embodiment, the value of a pixel in which the vein is captured is lower than the value of a pixel in which no vein is captured. Therefore, for example, the object area detection unit 11 defines, as the vein area, the set of pixels having pixel values less than or equal to a second binarization threshold value, and defines, as the non-vein area, the set of pixels having pixel values greater than the second binarization threshold value. For example, the second binarization threshold value is set to a preliminarily set fixed value (for example, 150), the average pixel value of individual pixels within the biological area, or a threshold value determined by subjecting, to discrimination analysis, pixel values included in the biological area.

The object area detection unit 11 binarizes the second biological image into pixels included in the vein area and pixels included in the non-vein area or the background area. For example, the value of a pixel included in the vein area is set to "1", for example, and the value of a pixel included in the non-vein area or the background area is set to "0", for example.

Depending on how the user places the finger, the vein of the finger is also captured in the second biological image in some cases. However, the relative position of the vein of the finger with respect to the vein of the palm changes depending on an angle between fingers. Therefore, when the vein of the finger is used for the matching processing, the matching accuracy is likely to be reduced. Therefore, it is desirable that the object area detection unit 11 detects the base portion of the finger on the basis of the binarized second biological image, and replaces the value of a pixel included in the vein area located above the base portion with the value of a pixel included in the non-vein area or the background area.

As described above, also in the second biological image, when drawing nearer to the upper end thereof, a region nearer to the tip of the finger is captured. Therefore, the base of the finger is likely to be captured in the vicinity of the upper end in the second biological image. Therefore, in a predetermined number of rows in the vicinity of the upper end in the binarized second biological image, the object area detection unit 11 detects, as a row in which the base portion of the finger is captured, a row where there are successive pixels whose section is greater than or equal to a predetermined width corresponding to a distance between fingers and that have pixel values included in the non-vein area or the background area and a section sandwiched between vein areas is included. In addition, with respect to each of sections in which there are successive pixels having pixel values included in the non-vein area or the background area, the object area detection unit 11 obtains the center position of the section in the lateral direction, and defines the center position as the position of the base of the finger in the lateral direction. In addition, the object area detection unit 11 stores, in the storage unit 5, the position of the base of the finger in the lateral direction with associating the position of the base of the finger in the lateral direction with the second biological image. In addition, the predetermined number of rows is set to the number of rows corresponding to the allowable width of a position displacement amount in the longitudinal direction, for example, 20 rows, the allowable width allowing the hand to be placed so that the fingerprint is captured in the first biological image and the vein pattern of the palm is captured in the second biological image. In the binarized second biological image, the object area detection unit 11 replaces, with the value of a pixel included in the non-vein area or the background area, the value of a pixel included in each row located above a row located lowest among rows in which the base portion of the finger is captured.

The object area detection unit 11 temporarily stores the binarized second biological image in the storage unit 5.

In the present embodiment, as illustrated in FIG. 4, when the user having a standard-sized hand places the hand so that the pin 431a is sandwiched between the vicinities of the bases of the index finger and the middle finger and the pin 431b is sandwiched between the vicinities of the bases of the middle finger and the annular finger, the hand is disposed in an adequate position. However, when the hand is not disposed so that the pins 431a and 431b are sandwiched between the fingers at the time of the acquisition of the first biological image and the second biological image, a fingerprint is not captured on the first biological image or a vein pattern is not captured on the second biological image, in some cases. In particular, if the finger does not come into contact with the protective cover 44, the fingerprint is not captured in the first biological image.

In addition, since there is an individual difference in the size of the hand, a distance between the pin 431a and the pin 431b does not coincide with a distance between the bases of the fingers of the user, in some cases. In such a case, it is difficult for the user to sandwich each pin between the bases of the fingers, and the user is likely to place the hand on the side of the body compared with an adequate position. In this case, for example, the base portion of the finger is captured on the second biological image.

Furthermore, depending on the size of the hand of the user, it is difficult for the user to place the hand so that the fingerprint is captured in the first biological image and the whole palm is captured in the second biological image, in some cases. In such a case, the fingerprint lacks a portion thereof on the first biological image or the vein pattern of the palm lacks a portion thereof on the second biological image.

In this way, when a biological image in which no fingerprint is captured or a portion of the fingerprint or the vein pattern is not captured is used for the matching processing, the matching accuracy is likely to be reduced.

Therefore, on the basis of the ridge line area and the vein area, the position determination unit 12 determines whether or not the hand of the user is placed in an adequate position where the whole fingerprint of the finger of the user is captured in the first biological image and the whole vein pattern of the palm of the user is captured in the second biological image. In addition, when it is determined that a portion of the fingerprint or a portion of the vein pattern falls outside the imaging range of the corresponding sensor, the position determination unit 12 obtains, on the basis of a positional relationship among the guiding member, the fingerprint, and the vein pattern, the moving direction of the hand of the user, used for adequately disposing the hand of the user.

In order to determine whether or not the fingerprint is captured in the first biological image, the position determination unit 12 calculates the total number of pixels included in the ridge line area of each finger in the binarized first biological image. In addition, when the total number of pixels is less than a predetermined threshold value with respect to each finger, the position determination unit 12 determines that the fingerprint of the finger is not captured in the first biological image, and on the other hand, when the total number of pixels is greater than or equal to the predetermined threshold value, the position determination unit 12 determines that the fingerprint of the finger is captured in the first biological image. In addition, for example, the predetermined threshold value is set to $1/10$ of the standard number of pixels included in the ridge line area of one finger. In addition, in the present embodiment, since the fingerprint sensor 41 takes an image of the fingerprints of the index finger, the middle finger, and the annular finger, if the fingerprints of these three fingers are captured in the first biological image, the number of boundaries between adjacent fingers turns out to be "2". Therefore, when the number of detected boundaries between adjacent fingers is less than or equal to "1", the position determination unit 12 determines that the fingerprint of one of the fingers is not captured.

The position determination unit 12 determines whether or not pixels included in the ridge line area, whose number is greater than or equal to a predetermined number, exist in the column of pixels in one of image edges located on the left, right, top, and bottom of the binarized first biological image. When pixels included in the ridge line area, whose number is greater than or equal to the predetermined number, exist in one of the columns of pixels, namely, the ridge line area of one of the fingers comes into contact with the image edge, the position determination unit 12 determines that the fingerprint of one of the fingers protrudes from the imaging range of the fingerprint sensor 41. Namely, the position determination unit 12 determines that the position of the hand of the user is not adequate.

In addition, the position determination unit 12 determines whether or not pixels included in the vein area, whose number is greater than or equal to a predetermined number, exist in the column of pixels in one of image edges located on the left, right, top, and bottom of the binarized second biological image. When pixels included in the vein area, whose number is greater than or equal to the predetermined number, exist in one of the columns of pixels, the vein pattern of the palm comes into contact with the image edge of the second biological image. In this case, the position determination unit 12 determines that a portion of the vein pattern of the palm protrudes from the imaging range of the vein sensor 42. Namely, the position determination unit 12 determines that the position of the hand of the user is not adequate. In addition, the predetermined number is set to a positive value greater than or equal to "1", for example, 1 to 5.

On the other hand, when the fingerprint of each finger is detected and the image edge and the ridge line area do not come into contact with each other, in the first biological image, and the image edge of the second biological image and the vein area do not come into contact with each other, the position determination unit 12 determines that the position of the hand of the user is adequate.

When it is determined that no fingerprint is captured in the first biological image, the position determination unit 12 causes the display unit 2 to display a guidance message instructing that a finger is to be placed on the protective cover 43.

In addition, when the position determination unit 12 determines that one of the fingers protrudes from the left end or right end of the imaging range of the fingerprint sensor 41, a distance between the pin 431a and the pin 431b is likely not to coincide with a distance between the bases of the fingers of the user. Therefore, for example, the position determination unit 12 calculates a difference between a distance between the center of the pin 431a and the center of the pin 431b and a distance between the positions in the lateral direction of the bases of the adjacent fingers. In addition, the position determination unit 12 defines, as the moving directions of the two pins, directions where the difference becomes zero. In addition, the position determination unit 12 defines ½ of the difference as the displacement amount of each pin. In addition, the position determination unit 12 notifies the guide controller 13 of the moving direction and the displacement amount of each pin. Accordingly, it is possible for the user to sandwich the two pin between the vicinities of the bases of the fingers. In addition, it is desirable that an initial distance between the two pins 431a and 431b when the first and second biological images are taken first is set to be wide enough for most of the users to sandwich the pins between the fingers, for example. For example, the initial distance is set to a distance corresponding to the top 1% of the distribution of a distance between the midpoints of two adjacent spaces in the bases of the fingers, calculated from the second biological image obtained with respect to registered users that have already been registered.

In addition, when the wrist side of the vein pattern of the palm (namely, a lower end side in the second biological image) falls outside the imaging range of the vein sensor 42, the position determination unit 12 determines whether or not the object area detection unit 11 has detected the base of the finger on the second biological image. In addition, when the base of the finger has been detected on the second biological image, the position determination unit 12 causes the display unit 2 to display a guidance message instructing that the hand is to be moved in the longitudinal direction so as to sandwich the two pins between the vicinities of the bases of the fingers.

Furthermore, when a vein image comes into contact with two sides facing each other in the second biological image, the position determination unit 12 determines that the palm of the user does not fall inside the imaging range of the vein sensor 42, and set an out-of-range flag indicating that effect.

In order for the hand of the user to be adequately located, the guide controller 13 controls the guide mechanism 43 in the biological information acquisition unit 4 so as to move the guiding member by a displacement amount given notice of, along the moving direction given notice of by the position determination unit 12.

To that end, the guide controller 13 transmits, to the drive circuits of the stepping motors 435a and 435b, instructions used for rotating the stepping motors 435a and 435b by rotation angles corresponding to moving directions and displacement amounts, given notice of.

After the guide controller 13 has moved the positions of the pins 431a and 431b or a predetermined time (for example, one second to three seconds) has elapsed after the display unit 2 has been caused to display the guidance message used for moving the hand, the processor 6 causes the biological information acquisition unit 4 to retake the images of the fingerprint and the vein pattern. In addition, the processor 6 receives the obtained first biological image and the obtained second biological image from the biological information acquisition unit 4.

The matching-use data generation unit 14 generates matching-use data to be used in the matching processing from the first and second biological images. For example, when the biometric authentication device 1 performs the matching processing on the basis of Minutia matching, the matching-use data generation unit 14 extracts, from the first and second biological images, characteristic points (called minutiae) to be used in the Minutia matching, and defines the positions of the characteristic points or the types of the characteristic points as the matching-use data.

With respect to the first biological image in which the fingerprint is captured, the matching-use data generation unit 14 extracts, as the characteristic points to be used in the Minutia matching, the branch point and the end point of the ridge line from the first biological image, for example. To that end, the matching-use data generation unit 14 performs thinning processing on the set of pixels having pixel values corresponding to the ridge line on the binarized first biological image, and generates a thinned binarized image where the ridge line is thinned. In addition, the matching-use data generation unit 14 scans the thinned binarized image using a plurality of templates corresponding to one of the branch point and the end point of the ridge line, and hence detects a position on the thinned binarized image when one of the templates is matched. In addition, the matching-use data generation unit 14 extracts, as a minutia, the center pixel of the detected position. In addition, for example, the template is expressed using 3×3 pixels, and has a binarized pattern corresponding to the branch point or the end point of the ridge line. Furthermore, the matching-use data generation unit 14 may also extract, as the minutia, a singular point such as the center of an eddy or a delta in the fingerprint. In addition, for example, in the same way as in the case of detecting the branch point or the end point of the ridge line, the matching-use data generation unit 14 can detect the singular point by performing pattern matching between a template corresponding to the singular point and the biological image.

For example, by comparing the position of a boundary between adjacent fingers with the position of the minutia, the matching-use data generation unit 14 determines in the ridge line area of which finger each extracted minutia is included. In addition, the matching-use data generation unit 14 associates each minutia with the identification number of a finger corresponding to a ridge line area including the minutia.

In addition, the matching-use data generation unit 14 may also extract a minutia only with respect to a ridge line area corresponding to one or more specific fingers, for example, the index finger.

With respect to the second biological image in which the vein pattern of the palm is captured, the matching-use data generation unit 14 extracts the branch point and the end point of a vein from the binarized second biological image. To that end, for example, the matching-use data generation unit 14 performs thinning processing on the set of pixels having pixel values corresponding to the vein on the binarized second biological image, and generates a thinned binarized image where the vein is thinned. In addition, the matching-use data generation unit 14 scans the thinned binarized image using a plurality of templates corresponding to one of the branch point and the end point of the vein, and hence detects a position on the thinned binarized image when one of the templates is matched. In addition, the matching-use data generation unit 14 extracts, as a minutia, the center pixel of the detected position.

In addition, the matching-use data generation unit 14 may also extract a minutia from the first biological image using another existing method for obtaining, as a minutia, the end point, the branch point, or the singular point of the ridge line. In the same way, a minutia may also be extracted from the second biological image using another existing method for obtaining, as minutiae, the end point and the branch point of the vein. In addition, the matching-use data generation unit 14 may also obtain, as the matching-use data, another characteristic quantity expressing the characteristic of the fingerprint or the vein pattern on the first and second biological images. For example, the matching-use data generation unit 14 may also segment the ridge line area of each finger into a plurality of blocks and obtain, as the matching-use data, the ridge line direction of each block. In addition, the matching-use data generation unit 14 may also segment the vein area into a plurality of blocks and obtain, as the matching-use data, the number of veins of each block.

In addition, when the biometric authentication device 1 performs the matching processing on the basis of pattern matching, the matching-use data generation unit 14 may also define, as the matching-use data, the first biological image itself or a partial area cut out from the first biological image. When a portion of the first biological image is defined as the matching-use data, it is desirable that the partial area includes the fingerprint of each finger captured in the first biological image. Therefore, for example, the matching-use data generation unit 14 may also trim, from the first biological image, an area surrounded by the circumscribed rectangle of the ridge line area of each finger, and define the trimmed area as the matching-use data.

In the same way, the matching-use data generation unit 14 may also define, as the matching-use data, the second biological image itself or a partial area that includes the vein area on the second biological image and is cut out from the second biological image. Furthermore, the matching-use data generation unit 14 may also define, as the matching-use data, an image obtained by performing edge enhancement processing, unevenness correction processing, or the like on the whole of each biological image or a portion of each biological image.

The registration unit 15 stores, in the storage unit 5, the identification information of a registered user, obtained from the input unit 2, and matching-use data created from each of the first and second biological images with associating the identification information and the matching-use data with each other. In addition, when the out-of-range flag has been set with respect to the second biological image, the registration unit 15 also stores, in the storage unit 5, the out-of-range flag with associating the out-of-range flag with the identification information of the registered user.

Using the matching-use data of the user and the matching-use data of a registered user having identification information matching identification information input through the input unit 2, the matching unit 16 matches the fingerprint of each finger and the vein pattern of the user against the fingerprint of each finger and the vein pattern of the registered user. In addition, as the result of the matching processing, the matching unit 16 obtains the degree of similarity expressing how the fingerprints of the fingers and the vein pattern of the user are similar to the fingerprints of the fingers and the vein pattern of the registered user.

As the matching processing, the matching unit 16 may use the Minutia matching or the pattern matching, for example.

With respect to the matching of the fingerprint, for example, using the matching-use data relating to the fingerprint of one preliminarily set finger, or the matching-use data relating to the fingerprints of all fingers captured in the first biological image, the matching unit 16 executes the matching processing.

When the Minutia matching is used, the matching unit 16 obtains the number of matched minutiae between minutiae included in the matching-use data of the registered user relating to a targeted finger and minutiae included in the matching-use data of the user. In addition, by dividing the number of matched minutiae by the number of minutiae extracted with respect to the targeted finger of the user, it is possible for the matching unit 16 to calculate the degree of similarity between the fingerprint of the user and the fingerprint of the registered user with respect to the targeted finger.

Alternatively, when the pattern matching is used, the matching unit 16 calculates a normalized cross-correlation value with changing a relative position between the targeted finger areas. In addition, the matching unit 16 defines the maximum value of the normalized cross-correlation value as the degree of similarity between the fingerprint of the user and the fingerprint of the registered user with respect to the targeted finger.

In addition, when the matching unit 16 executes the matching processing using the matching-use data of a plurality of fingers, the matching unit 16 calculates the degree of similarity with respect to each finger captured in the first biological image. In addition, the matching unit 16 defines the average value or the maximum value of the calculated degrees of similarity as the degree of similarity between the fingerprint of the user and the fingerprint of the registered user.

Also with respect to the matching of the vein pattern, the matching unit 16 performs the same processing as the processing for calculating the degree of similarity relating to the fingerprint, and hence it is possible for the matching unit 16 to calculate the degree of similarity between the vein pattern of the registered user and the vein pattern of the user. For example, when using the Minutia matching, the matching unit 16 obtains the number of matched minutiae between minutiae included in the matching-use data of the registered user relating to the vein pattern and minutiae included in the matching-use data of the user. In addition, by dividing the number of matched minutiae by the number of minutiae extracted with respect to the vein pattern of the user, it is possible for the matching unit 16 to calculate the degree of similarity between the vein pattern of the user and the vein pattern of the registered user.

Alternatively, when the pattern matching is used, the matching unit 16 calculates a normalized cross-correlation value with changing a relative position between the second biological image of the user and the second biological image of the registered user. In addition, the matching unit 16 defines the maximum value of the normalized cross-correlation value as the degree of similarity between the vein pattern of the user and the vein pattern of the registered user.

The matching unit 16 provides each of the degree of similarity of the fingerprint and the degree of similarity of the vein pattern to the authentication determination unit 17 along with the identification information of the registered user.

In addition, when the identification information of the user has not been input, the matching unit 16 individually calculates the degree of similarity of the fingerprint and the degree of similarity of the vein pattern with respect to each registered user. In addition, the matching unit 16 selects a registered user where the sum of the degree of similarity of the fingerprint and the degree of similarity of the vein pattern is maximized. In addition, the matching unit 16 provides, to the authentication determination unit 17, the degree of similarity of the fingerprint and the degree of similarity of the vein pattern, which correspond to the maximum value of the sum of the degrees of similarity, and the identification information of the registered user corresponding to the maximum value thereof.

When the sum of the degree of similarity of the fingerprint and the degree of similarity of the vein pattern is greater than or equal to an authentication determination threshold value, the authentication determination unit 17 determines that the fingerprint and the vein pattern of the user match the fingerprint and the vein pattern of the registered user. In addition, the authentication determination unit 17 authenticates the user as the registered user thereof. When having authenticated the user, the authentication determination unit 17 notifies the processor 6 of the authentication result.

On the other hand, when the sum of the degrees of similarity is less than the authentication determination threshold value, the authentication determination unit 17 determines that the fingerprint and the vein pattern of the user do not match the fingerprint and the vein pattern of the registered user. In this case, the authentication determination unit 17 does not authenticate the user. The authentication determination unit 17 notifies the processor 6 of an authentication result indicating that the authentication of the user has failed. In addition, the processor 6 may also transmit, to the display unit 2, authentication result information indicating the authentication result.

It is desirable that the authentication determination threshold value is set to a value causing the authentication determination unit 17 to succeed in authentication only when one registered user oneself is the user. In addition, it is desirable that the authentication determination threshold value is set to a value causing the authentication determination unit 17 to fail in authentication when another person different from the registered users is the user. For example, the authentication determination threshold value may be set to a value obtained by adding, to the minimum value of the sum of the degrees of similarity, a value obtained by multiplying, by 0.7, a difference between a maximum value and a minimum value the sum of the degree of similarity of the fingerprint and the degree of similarity of the vein pattern can have.

In addition, in a case where the out-of-range flag is set for the user or the registered user, when the degree of similarity between the fingerprint of the user and the fingerprint of the registered user is greater than or equal to an individual authentication determination threshold value, the authentication determination unit 17 determines that the fingerprint of the user matches the fingerprint of the registered user. In addition, the authentication determination unit 17 may also authenticate the user as the registered user. In addition, for example, the individual authentication determination threshold value may be set to a value obtained by adding, to the minimum value of the degree of similarity of the fingerprint, a value obtained by multiplying, by 0.7, a difference between a maximum value and a minimum value the degree of similarity of the fingerprint can have.

Alternatively, only when the degree of similarity between the fingerprint of the user and the fingerprint of the registered user is greater than or equal to the individual authentication determination threshold value and an input password matches the password of the registered user, the authentication determination unit 17 may authenticate the user as the registered user.

Figure 6:
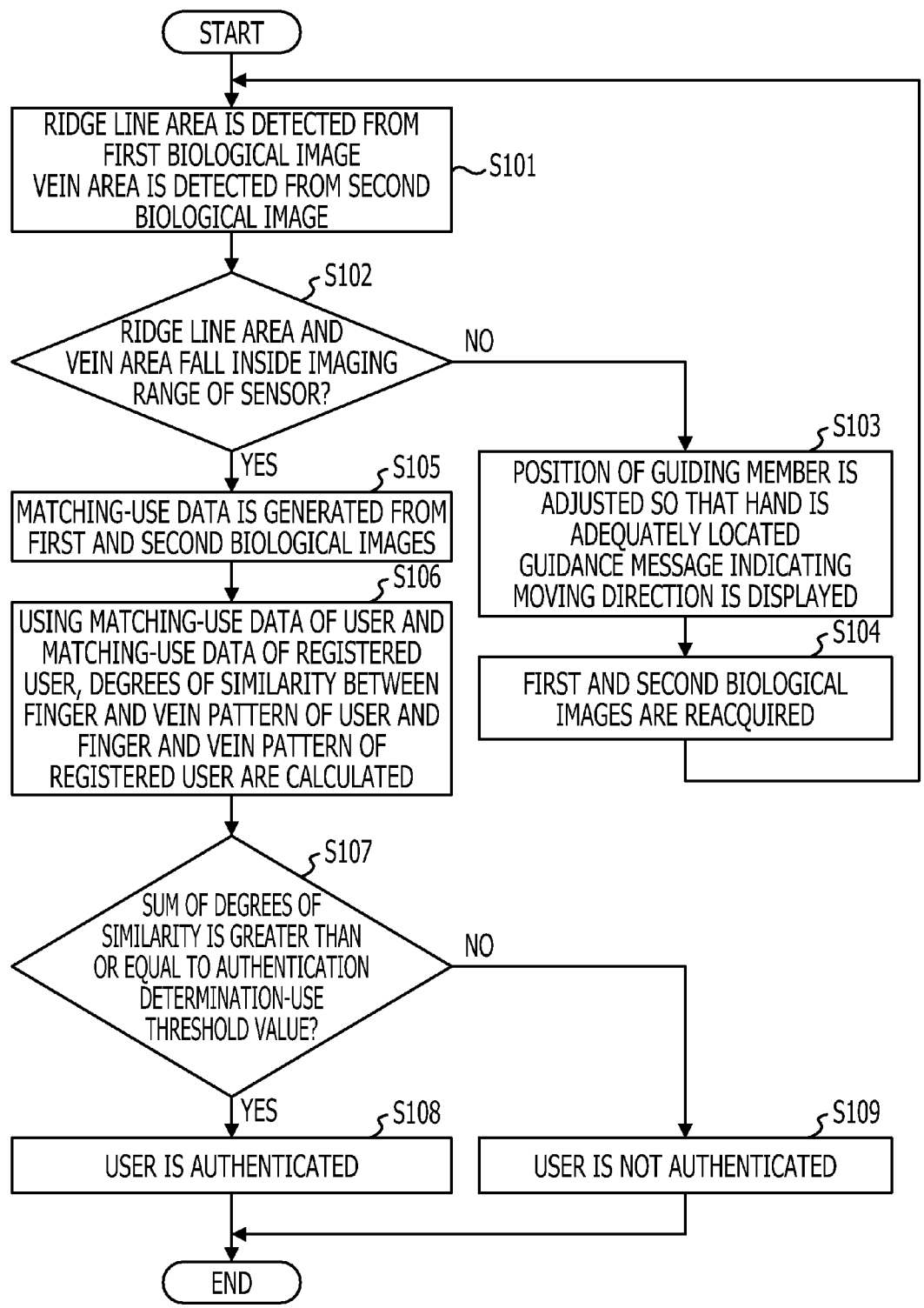
FIG. 6 is an operation flowchart of biometric authentication processing.

FIG. 6 is the operation flowchart of the biometric authentication processing executed by the processor 6.

When the processor 6 has received the first and second biological images from the biological information acquisition unit 4, the object area detection unit 11 in the processor 6 detects a ridge line area in which a ridge line is captured on the first biological image. In addition, the object area detection unit 11 detects a vein area in which a vein pattern is captured on the second biological image (Step S101). Next, on the basis of the ridge line area and the vein area, the position determination unit 12 in the processor 6 determines whether or not the fingerprint of each finger and the vein pattern fall inside the imaging ranges of the fingerprint sensor 41 and the vein sensor 42, respectively (Step S102). When the fingerprint of one finger falls outside the imaging range of the fingerprint sensor 41 or the vein pattern falls outside the imaging range of the vein sensor 42 (Step S102: No), the guide controller 13 in the processor 6 adjusts the position of the guiding member so that the hand of the user is adequately located. Alternatively, the processor 6 causes the display unit 2 to display a guidance message used for causing the user to place the hand in an adequate position (Step S103). In addition, the processor 6 causes the biological information acquisition unit 4 to retake images of the finger and the palm of the user, and reacquires the first and second biological images (Step S104). After that, the processor 6 re-executes the procedures in and subsequent to Step S101.

On the other hand, when the fingerprint of each finger and the vein pattern fall inside the imaging ranges of the fingerprint sensor 41 and the vein sensor 42, respectively (Step S102: Yes), the position of the hand of the user is adequate. Therefore, the matching-use data generation unit 14 in the processor 6 generates matching-use data from each of the first and second biological images (Step S105). In addition, the processor 6 provides the matching-use data to the matching unit 16. Furthermore, when the identification information of the user has been acquired through the input unit 2, the processor 6 reads, from the storage unit 5, the matching-use data of a registered user associated with identification information matching the identification information thereof, and provides the matching-use data to the matching unit 16. On the other hand, when the identification information of the user has not been input, the processor 6 reads, from the storage unit 5, the matching-use data of every registered user, and provides each piece of matching-use data and the identification information of a corresponding registered user to the matching unit 16.

On the basis of the matching-use data relating to the fingerprint of the user and the matching-use data relating to the fingerprint of the registered user, the matching unit 16 calculates the degree of similarity between the fingerprint of the user and the fingerprint of the registered user. In addition, on the basis of the matching-use data relating to the vein pattern of the user and the matching-use data relating to the vein pattern of the registered user, the matching unit 16 calculates the degree of similarity between the vein pattern of the user and the vein pattern of the registered user (Step S106). In addition, the matching unit 16 provides, to the authentication determination unit 17, the identification information of the registered user along with the degree of similarity of the fingerprint and the degree of similarity of the vein pattern. In addition, when the identification number of the user has not been obtained, the matching unit 16 calculates the maximum value of the sum of the degree of similarity with respect to the fingerprint of the user and the degree of similarity with respect to the vein pattern of the user that are obtained with respect to each registered user. In addition, the matching unit 16 provides, to the authentication determination unit 17, the identification information of a registered user corresponding to the maximum value, along with the maximum value.

The authentication determination unit 17 determines whether or not the sum of the degrees of similarity is greater than or equal to an authentication determination-use threshold value (Step S107).

When the sum of the degrees of similarity is greater than or equal to the authentication determination-use threshold value (Step S107: Yes), the authentication determination unit 17 authenticates the user as the registered user (Step S108).

On the other hand, when the sum of the degrees of similarity is less than the authentication determination-use threshold value (Step S107: No), the authentication determination unit 17 does not authenticate the user (Step S109).

After Step S108 or S109, the biometric authentication device 1 terminates the biometric authentication processing.

In addition, when the biometric authentication device 1 performs the registration processing, the registration unit 15 may execute a procedure for storing, in the storage unit 5, the matching-use data along with the identification information of the user, in place of the procedures in the above-mentioned Steps S106 to S109.

As described above, from an object area captured in at least one of the two biological images, the biometric authentication device according to this embodiment determines whether or not the position of the hand of the user is adequate for taking images of the fingerprint and the vein pattern of the palm. In addition, when the position of the hand of the user is not adequate, this biometric authentication device obtains the moving direction of the hand so as to cause the position of the hand of the user to be adequate, on the basis of a positional relationship between the guiding member and the fingerprint or vein pattern obtained from the object area on the image. In addition, when the position of the hand of the user becomes adequate by adjusting the position of the guiding member, this biometric authentication device controls the guide mechanism so as to automatically calibrate the position of the guiding member. Therefore, even if the user is unfamiliar with a biometric authentication device, it is possible for this biometric authentication device to dispose the hand of the user in an adequate position and take an image of the hand disposed in the adequate position. Accordingly, it is possible for this biometric authentication device to take images, adequate for matching, of both of the fingerprint of the finger and the vein pattern of the palm.

Next, a biometric authentication device according to a second embodiment will be described. Compared with the biometric authentication device according to the first embodiment, the biometric authentication device according to the second embodiment is different in that the shape of a guiding member included in a guide mechanism is different, and is different in that the existence range of the fingerprint is estimated from a ridge line area on the first biological image and the estimated existence range is used for adjusting the position of the guiding member.

Therefore, hereinafter, from among the individual configuration elements of the biometric authentication device according to the second embodiment, differences from the configuration elements of the biometric authentication device according to the first embodiment will be described. With respect to the details of the other configuration elements of the biometric authentication device according to the second embodiment, refer to the descriptions of the corresponding configuration elements of the biometric authentication device according to the first embodiment.

Figure 7A:
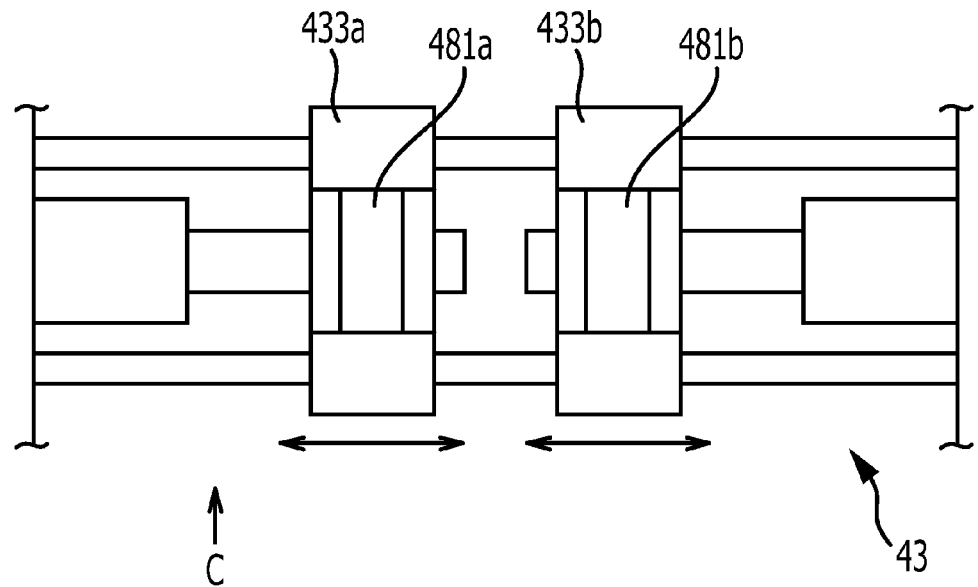
FIG. 7A is a schematic plan view of a biological information acquisition unit included in a biometric authentication device according to the second embodiment.
Figure 7B:
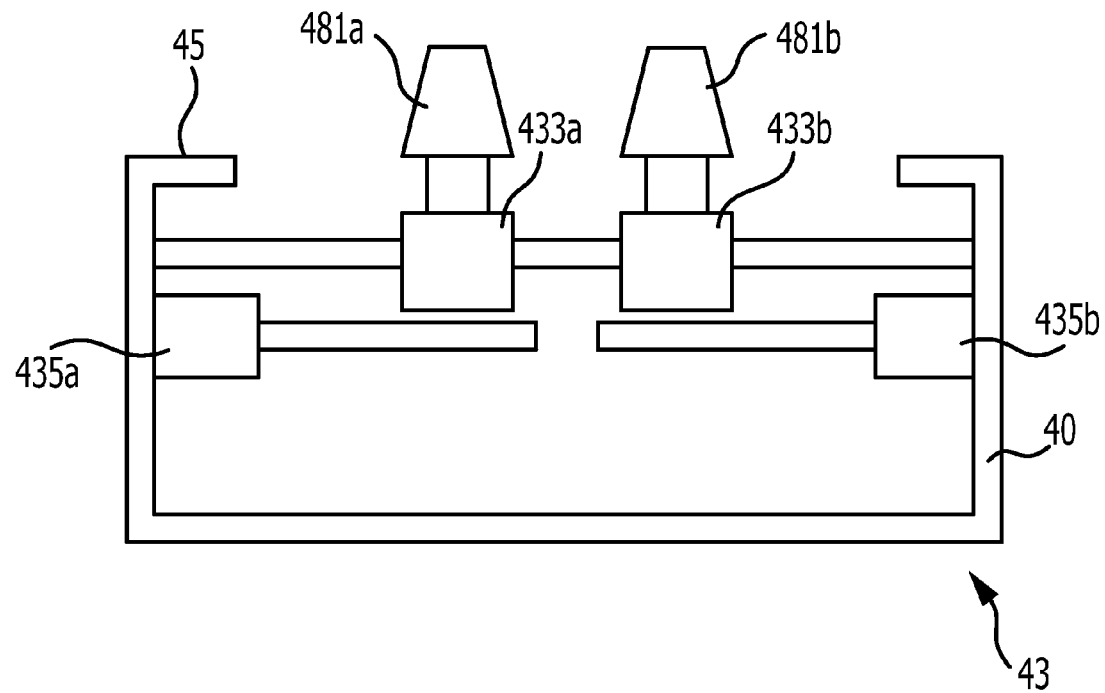
FIG. 7B is a schematic side view of the biological information acquisition unit viewed from the direction of an arrow C in FIG. 7A.

FIG. 7A is the schematic plan view of a biological information acquisition unit 4 included in the biometric authentication device according to the second embodiment, and FIG. 7B is the schematic side view of the biological information acquisition unit 4 viewed from the direction of an arrow C in FIG. 7A. In addition, in FIG. 7A and FIG. 7B, the same reference number as the reference number of the corresponding configuration element of the biological information acquisition unit 4 illustrated in FIG. 3A and FIG. 3B is assigned to each unit of the biological information acquisition unit 4.

In the second embodiment, the guide mechanism 43 is also disposed between the fingerprint sensor 41 and the vein sensor 42. In this regard, however, in this embodiment, the guide mechanism 43 includes, as guiding members, wavy guides 481*a* and 481*b* disposed so as to project onto the top surface cover 45 and formed using wood, resin, or metal. The cross-sections in the lateral direction of the wavy guides 481*a* and 481*b* are approximately triangle shapes, convex upward, and the sizes in the longitudinal direction of the wavy guides 481*a* and 481*b* are larger than the sizes in the lateral direction thereof. When taking images of the fingerprint and the vein pattern, the user places the hand so as to sandwich the wavy guide 481*a* between the index finger and the middle finger and sandwich the wavy guide 481*b* between the middle finger and the annular finger. The wavy guides 481*a* and 481*b* have certain levels of lengths in the longitudinal direction, and as a result, an area where the finger of the user and the wavy guides come into contact with each other is larger than an area where the two pins and the finger of the user come into contact with each other in the first embodiment. Therefore, compared with the two pins in the first embodiment, it is possible for the wavy guides 481*a* and 481*b* to successfully fix the hand of the user.

In addition, in each of the lower end of the wavy guide 481*a* and the lower end of the 481*b*, a rod-shaped projecting portion is formed, and the projecting portion is inserted into a groove 432 formed in the top surface cover 45 of the housing 40. In addition, the projecting portions in the wavy guides 481*a* and 481*b* are held by the holding members 433*a* and 433*b* provided within the housing 40, respectively. In the same way as in the first embodiment, the holding members 433*a* and 433*b* are driven by the stepping motors 435*a* and 435*b* provided within the housing 40, respectively, and held so as to be movable in the lateral direction along the groove 432. Therefore, it is possible to adjust a distance between the wavy guides 481*a* and 481*b* in response to the size of the hand of the user. In addition, with respect to the details of the structure of the holding members 433*a* and 433*b* and a structure for holding the holding members 433*a* and 433*b* so that the holding members 433*a* and 433*b* are movable, refer to FIG. 3A and FIG. 3B.

Also in this embodiment, the biological information acquisition unit 4 generates the first biological image in which the fingerprints of a plurality of fingers of the user are captured, on the basis of the fingerprint sensor 41 disposed on the tip side of the finger, and the second biological image in which the vein pattern of the palm of the user is captured, on the basis of the vein sensor 42 disposed on a hand side. In addition, the biological information acquisition unit 4 transmits, to the processor 6, the first biological image and the second biological image.

In the same way as in the processor in the biometric authentication device according to the first embodiment, the processor 6 in the biometric authentication device according to the second embodiment also includes an object area detection unit 11, a position determination unit 12, a guide controller 13, a matching-use data generation unit 14, a registration unit 15, a matching unit 16, and an authentication determination unit 17. Among them, the object area detection unit 11, the matching-use data generation unit 14, the registration unit 15, the matching unit 16, and the authentication determination unit 17 have the same functions as those of the corresponding configuration element of the biometric authentication device according to the first embodiment. Therefore, hereinafter, the position determination unit 12 and the guide controller 13 will be described.

The position determination unit 12 determines whether or not a portion of the fingerprint falls outside the imaging range of the fingerprint sensor 41 and whether or not a portion of the vein pattern of the palm falls outside the imaging range of the vein sensor 42. In the same way as in the first embodiment, when pixels included in the ridge line area, whose number is greater than or equal to a predetermined number, exist in one of image edges located on the left, right, top, and bottom of the first biological image, the position determination unit 12 determines that a portion of the fingerprint falls outside the imaging range of the fingerprint sensor 41. In addition, when pixels included in the vein area, whose number is greater than or equal to a predetermined number, exist in one of image edges located on the left, right, top, and bottom of the second biological image, the position determination unit 12 determines that a portion of the vein pattern falls outside the imaging range of the vein sensor 42. In addition, it is desirable that, before it is determined whether or not a portion of the vein pattern falls outside the imaging range of the vein sensor 42, the object area detection unit 11 removes, from the vein area, pixels in which the vein of the portion of the finger is captured.

When a portion of the fingerprint of one finger falls outside the imaging range of the fingerprint sensor 41, the position determination unit 12 estimates the existence range of the fingerprint in the image plane of the first biological image. To that end, the position determination unit 12 approximates, by a graphic circumscribing the fingerprint, the ridge line area of the finger in contact with the image edge in the binarized first biological image. In the present embodiment, it is assumed that the graphic circumscribing the fingerprint has an elliptical shape.

For example, with variously changing five parameters (the lateral direction coordinate $c_x$ and the longitudinal direction coordinate $c_y$ of the center, a long axis radius $r_x$, a short axis radius $r_y$, and a long axis direction p) specifying an arbitrary elliptical shape, the position determination unit 12 obtains an elliptical shape including the whole ridge line area of the fingerprint of the finger, a portion of the fingerprint falling outside the imaging range of the fingerprint sensor 41. In addition, the position determination unit 12 estimates, as the existence range of the fingerprint, an ellipse whose area is the smallest from among such ellipses.

In the same way, when a portion of the vein pattern of the palm falls outside the imaging range of the vein sensor 42, the position determination unit 12 estimates the existence range of the vein pattern in the image plane of the second biological image by approximating the existence range of the vein pattern by a graphic circumscribing the vein pattern. For example, it is assumed that the graphic circumscribing the vein pattern has an elliptical shape. In addition, the position determination unit 12 estimates, as the existence range of the vein pattern, an ellipse whose area is the smallest from among elliptical shapes each of which includes the whole vein area.

In addition, as for the fingerprint of a finger, which corresponds to a ridge line area in contact with no image edge of the first biological image, it is assumed that the ridge line area itself is regarded as the existence range of the fingerprint. In addition, when the whole vein pattern of the palm is captured in the second biological image, it is assumed that the vein area itself is regarded as the existence range of the vein pattern.

In addition, the graphic circumscribing the fingerprint and the graphic circumscribing the vein pattern are not limited to ellipses. For example, the graphic circumscribing the fingerprint and the graphic circumscribing the vein pattern may be a graphic obtained by averaging the external shapes of the fingerprints of a plurality of registered users and a graphic obtained by averaging the external shapes of the vein patterns thereof.

In order to obtain the moving directions and the displacement amounts of the hand and the wavy guide, which cause the position of the hand of the user to be adequately located, the position determination unit 12 causes the existence range of the fingerprint and the existence range of the vein pattern to virtually move, on the basis of a positional relationship between the wavy guide and each sensor. In addition, the position determination unit 12 determines whether or not the existence range of the fingerprint after movement falls within the imaging range of the fingerprint sensor 41 and the existence range of the vein pattern after movement falls within the imaging range of the vein sensor 42. Therefore, so as to deal with the fingerprint on the first biological image and the vein pattern on the second biological image with a common coordinate system expressing a positional relationship in a real space, the position determination unit 12 converts the coordinates of each biological image into the common coordinate system on the basis of the positional relationship of each sensor in the real space and the resolution of each sensor. In the common coordinate system, for example, the unit length of each of the lateral direction and the longitudinal direction is set to 1 mm.

Figure 8:
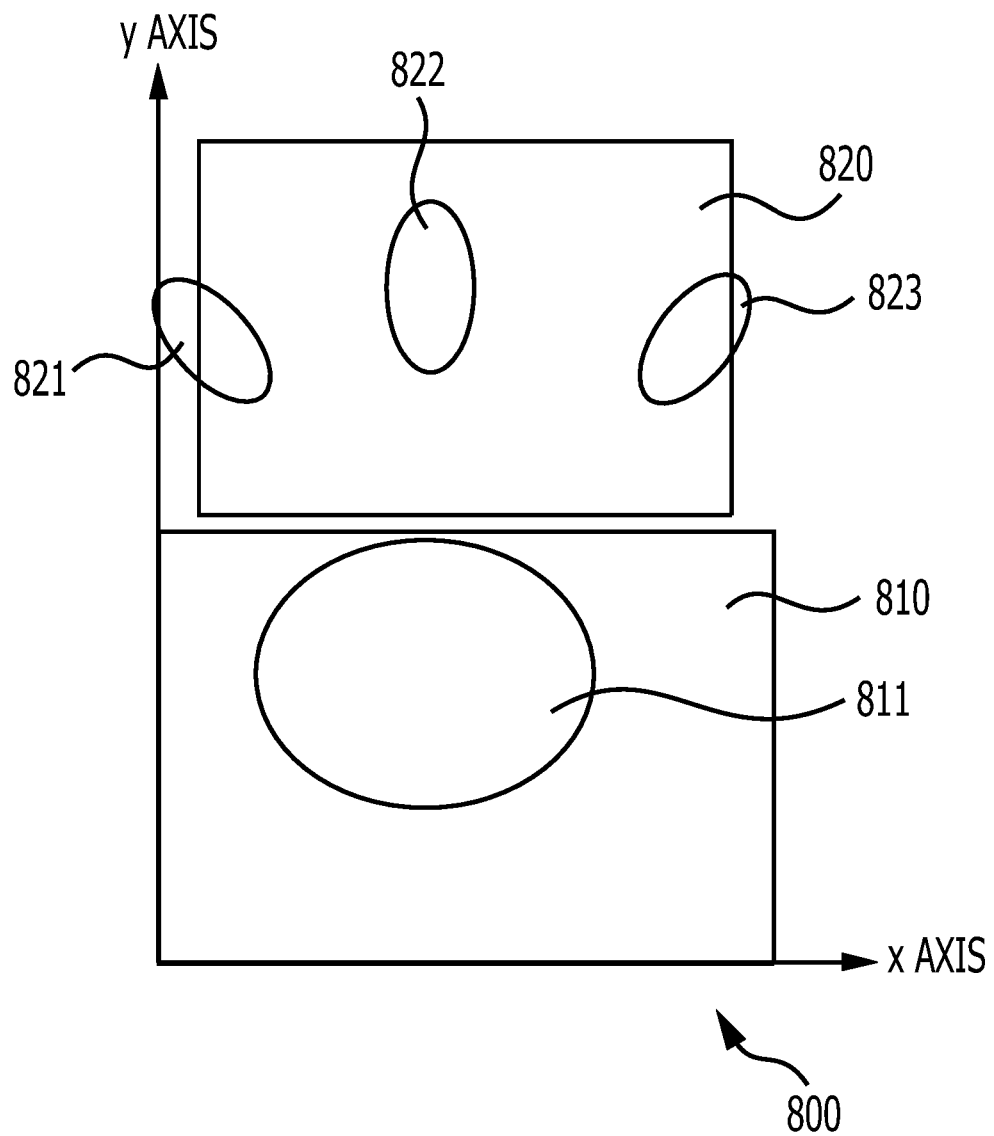
FIG. 8 is a diagram illustrating examples of an existence range of a fingerprint and an existence range of a vein pattern, expressed using a common coordinate system.

FIG. 8 is a diagram illustrating examples of the existence range of the fingerprint and the existence range of the vein pattern, expressed using the common coordinate system. In a common coordinate system 800, a longitudinal direction in the real space is expressed by a y axis, and a lateral direction therein is expressed by an x axis. In addition, a setting is configured in which the y axis coordinate of the lower end of the second biological image, namely, a boundary on a hand side within the imaging range of the vein sensor 42, is "0" and the coordinate value of the y axis increases with drawing near to the tip of the finger. Accordingly, the imaging range 820 of the fingerprint sensor 41 is located on an upper side, compared with the imaging range 810 of the vein sensor 42. In addition, in the common coordinate system 800, the existence range of the vein pattern is indicated by an ellipse 811, and the existence ranges of the fingerprints of the index finger, the middle finger, and the annular finger are indicated by ellipses 821 to 823, respectively. In addition, in this example, portions of the existence range 821 of the index finger and the existence range 823 of the annular finger fall outside the imaging range 820 of the fingerprint sensor 41.

Figure 9:
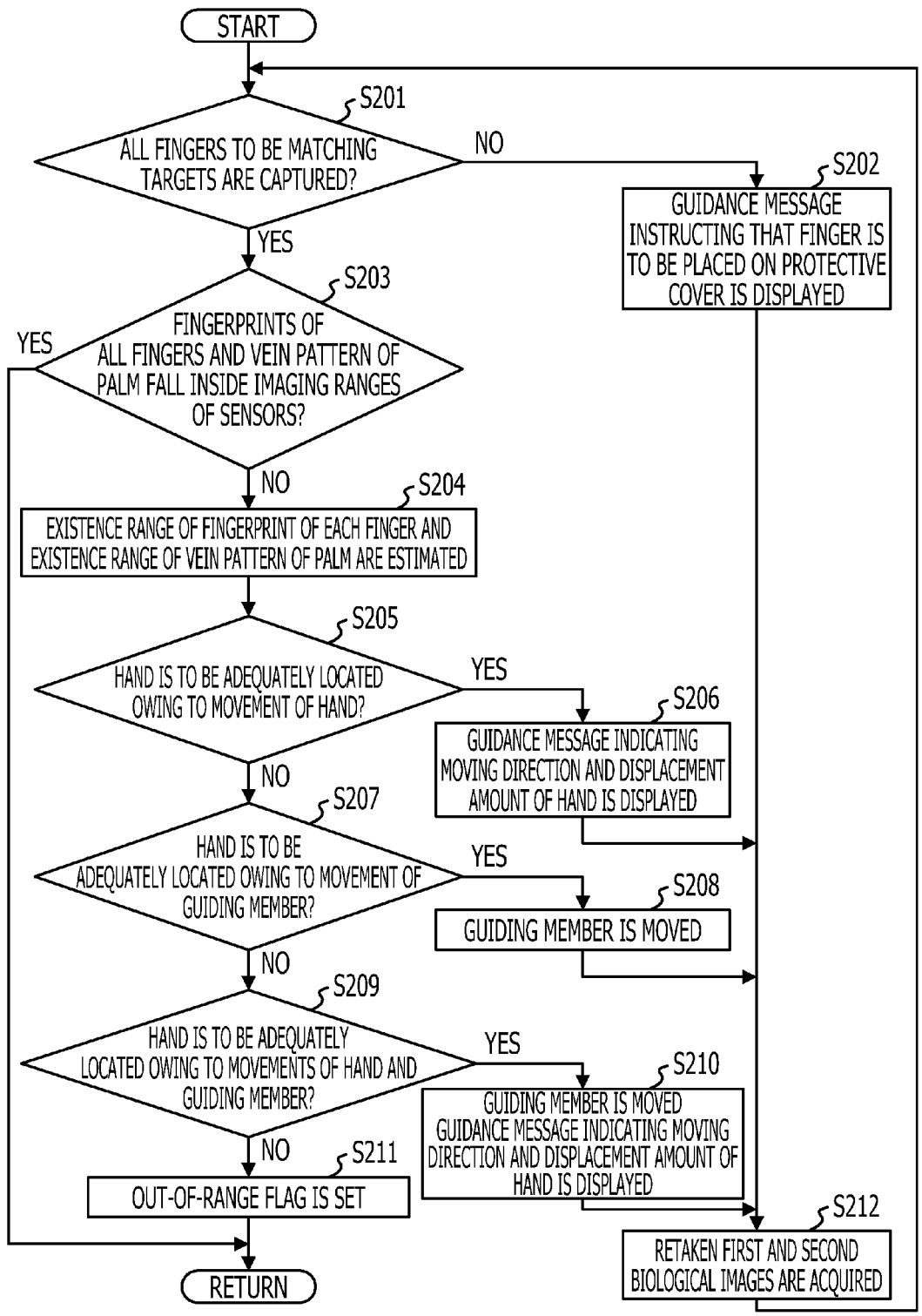
FIG. 9 is an operation flowchart of positioning processing.

FIG. 9 is the operation flowchart of positioning processing according to the second embodiment. In addition, this positioning processing is executed in place of the procedures in Steps S102 to S104 in the biometric authentication processing according to the first embodiment, illustrated in FIG. 6.

The position determination unit 12 in the processor 6 determines whether or not all fingers to be matching targets are captured in the first biological image (Step S201). In the same way as in the first embodiment, the position determination unit 12 obtains the number of fingers captured in the first biological image on the basis of the ridge line area, and when the number of fingers is equal to the number of the fingers to be matching targets, it is determined that all finger to be matching targets are captured.

When the fingerprint of one of the fingers is not captured (Step S201: No), the position determination unit 12 causes the display unit 2 to display a guidance message instructing that a finger is to be placed on the protective cover (Step S202). On the other hand, when all finger to be matching targets are captured (Step S201: Yes), the position determination unit 12 determines whether or not a portion of the fingerprint of one of the fingers or a portion of the vein pattern falls outside the imaging range of the sensor (Step S203). When the fingerprint of any one of the fingers falls inside the imaging range of the sensor and the vein pattern also falls inside the imaging range of the sensor (Step S203: Yes), the position determination unit 12 determines that the hand is adequately located. In addition, the position determination unit 12 terminates the positioning processing.

On the other hand, when a portion of the fingerprint of one of the fingers or a portion of the vein pattern falls outside the imaging range of the sensor (Step S203: No), the position determination unit 12 estimates the existence range of the fingerprint of each finger and the existence range of the vein pattern of the palm (Step S204). In addition, the position determination unit 12 calibrates the existence ranges of the fingerprint of each finger and the vein pattern in response to the virtual movement of the hand, and hence determines whether or not the hand is to be adequately located owing to the movement of the hand (Step S205).

When the hand is to be adequately located owing to the movement of the hand (Step S205: Yes), the position determination unit 12 causes the display unit 2 to display a guidance message instructing the moving direction and the displacement amount of the hand (Step S206).

On the other hand, when the hand is not to be adequately located even if the hand is moved (Step S205: No), the position determination unit 12 determines whether or not the hand is to be adequately located owing to the movement of the wavy guide (Step S207).

When the hand is to be adequately located owing to the movement of the wavy guide (Step S207: Yes), the position determination unit 12 notifies the guide controller 13 of the moving direction and the displacement amount of the wavy guide, and causes the guide controller 13 to move the wavy guide (Step S208).

On the other hand, when the hand is not to be adequately located even if the wavy guide is moved (Step S207: No), the position determination unit 12 determines whether or not the hand is to be adequately located owing to the movements of the wavy guide and the hand (Step S209). When the hand is to be adequately located owing to the movements of the wavy guide and the hand (Step S209: Yes), the position determination unit 12 notifies the guide controller 13 of the moving direction and the displacement amount of the wavy guide, and causes the guide controller 13 to move the wavy guide. Furthermore, the position determination unit 12 causes the display unit 2 to display a guidance message instructing the moving direction and the displacement amount of the hand (Step S210).

On the other hand, when the hand is not to be adequately located even if the hand and the wavy guide are moved (Step S209: No), the position determination unit 12 sets the out-of-range flag (Step S211). After that, the position determination unit 12 terminates the positioning processing.

In addition, after Step S202, S206, S208, or S210, the processor 6 causes the biological information acquisition unit 4 to retake images of the fingerprint and the vein pattern, and acquires, from the biological information acquisition unit 4, the first and second biological images generated owing to the retaking (S212). After that, the processor 6 re-executes the procedures in and subsequent to Step S201.

The wavy guide in the present embodiment may be fixed so that the longitudinal direction of the finger is headed in a direction along the wavy guide. Therefore, when the user moves the hand along the wavy guide, a direction in which the user can move the finger may be restricted.

Figure 10:
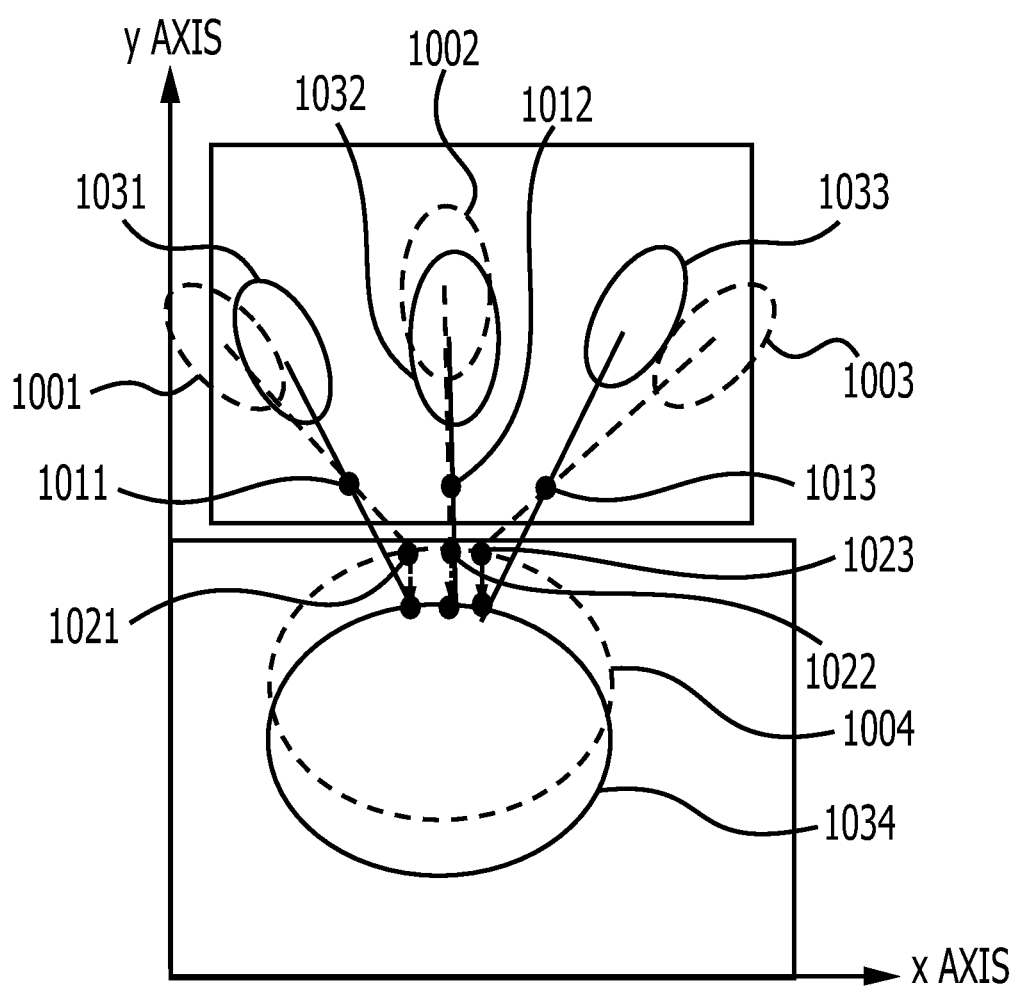
FIG. 10 is a diagram illustrating an example of a positional relationship among a wavy guide, an existence range of a fingerprint, and an existence range of a vein pattern.

FIG. 10 is a diagram illustrating an example of a positional relationship among the wavy guide, the existence range of the fingerprint, and the existence range of the vein pattern. Ellipses 1001 to 1004 expressed by dotted lines indicate the existence ranges of the fingerprints of the index finger, the middle finger, and the annular finger and the existence range of the vein pattern, respectively. In addition, points 1011 to 1013 are the points of intersection between a line joining the midpoint of the wavy guide 481*a* to the midpoint of the wavy guide 481*b* and the center lines of the fingers, respectively. Since the fingers can move only in a direction along the wavy guides 481*a* and 481*b*, even if the user moves the hand, the points of intersection 1011 to 1013 usually overlap with the fingers. Therefore, for convenience, the points of intersection are referred to as fixed points, hereinafter. In addition, because of the structure of the hand, the fingers rotate with the bases of the fingers 1021 to 1023 as rotation axes. Accordingly, for example, if a distance between the wavy guides is longer than a distance between the bases of the fingers, when the user moves the hand toward the side of the body, distances between the existence ranges of the fingerprints of the individual fingers become narrow. As a result, for example, the existence ranges of the fingerprints of the individual fingers turn out to be ellipses 1031 to 1033 expressed by solid lines, respectively. In addition, the existence range of the vein pattern moves downward, and turns out to be an ellipse 1034 expressed by a solid line. In this way, the virtual existence ranges of the fingerprints when the hand of the user has been virtually moved in a predetermined direction by a predetermined distance are estimated on the basis of the positions of the rotation axes corresponding to the bases of the fingers and the positions of the wavy guides. Hereinafter, for convenience, the virtual existence range of the fingerprint when the hand of the user has been virtually moved is referred to as a virtual fingerprint range. In the same way, the virtual existence range of the vein pattern when the hand of the user has been virtually moved is referred to as a virtual vein range.

In the present embodiment, since the two wavy guides are disposed in parallel to each other along the longitudinal direction, the moving direction of the hand of the user is restricted to the longitudinal direction. Therefore, the position determination unit 12 estimates the virtual fingerprint range of each finger when the hand has been virtually moved in the longitudinal direction by a predetermined distance, as follows.

The position determination unit 12 moves the position of the rotation axis of each finger in the longitudinal direction by a predetermined minute distance (for example, 1 mm). In addition, a point where a straight line, drawn through the weighted center of the existence range of the fingerprint and the fixed point, and the upper boundary of the existence range of the vein pattern intersect with each other may be defined as the rotation axis of each finger. In addition, ever finger, the position determination unit 12 defines, as the weighted center of the existence range of the fingerprint after movement, the ending point of a line segment, the line segment being drawn through the fixed point with the position of the rotation axis after movement as a starting point and having the same length as that of a line segment extending from the rotation axis to the weighted center of the existence range of the fingerprint before the hand has been virtually moved. In addition, the position determination unit 12 rotates the virtual fingerprint range with respect to the original existence range of the fingerprint by an angle between the line segment drawn through the rotation axis after movement and the fixed point and the line segment drawn through the rotation axis before movement and the fixed point.

In addition, by virtually moving the hand in the longitudinal direction by the predetermined distance, the existence range of the vein pattern is also moved in the longitudinal direction by that predetermined distance.

The position determination unit 12 determines whether or not the virtual fingerprint range falls inside the imaging range of the fingerprint sensor 41. To that end, the position determination unit 12 determines whether or not the ellipse indicating the virtual fingerprint range and lines indicating the right and left ends or the upper and lower ends of the imaging range of the fingerprint sensor 41 intersect with each other. In the present embodiment, in the common coordinate system, the right and left ends of the imaging range of the fingerprint sensor 41 are parallel to the y axis and the upper and lower ends of the imaging range of the fingerprint sensor 41 are parallel to the x axis. Therefore, if the x axis coordinates of the right and left ends of the virtual fingerprint range are located between the x axis coordinates of the right and left ends of the imaging range of the fingerprint sensor 41 and the y axis coordinates of the upper and lower ends of the virtual fingerprint range are located between the y axis coordinates of the upper and lower ends of the imaging range, the position determination unit 12 determines that the virtual fingerprint range is included in the imaging range. In addition, owing to the installation error of each sensor with respect to the housing, the end portion of the imaging range of the fingerprint sensor 41 is not parallel to the x axis or y axis of the common coordinate system, in some cases. Therefore, the position determination unit 12 calculates the point of intersection between the equation of a line expressing the upper and lower ends and the right and left ends of the imaging range of the fingerprint sensor 41 and the equation of an ellipse expressing the virtual fingerprint range of a targeted finger. In this case, if there is no intersection point, the position determination unit 12 determines that the virtual fingerprint range of the targeted finger is included in the imaging range of the fingerprint sensor 41.

In addition, the equation of a line expressing one of the image edges of the imaging range is expressed in accordance with the following Expression, for example.

$$x=x_0+t\cos d$$

$$y=y_0+t\sin d \quad (1)$$

Here, $(x_0, y_0)$ are the coordinates of a point through which a straight line expressing the image edge is drawn, and "d" is an angle between the straight line and the x axis. In addition, the equation of an ellipse expressing the virtual fingerprint range is expressed in accordance with the following Expression, for example.

$$x=r_x\cos p\cos\theta-r_y\sin p\sin\theta+c_x$$

$$y=r_x\sin p\cos\theta+r_y\cos p\sin\theta+c_y \quad (2)$$

Here, $(c_x, c_y)$ are the coordinates of the center of the ellipse, and "$r_x$" and "$r_y$" are a long axis radius and a short axis radius, respectively. In addition, "p" indicates a long axis direction. In this case, if a determination value D calculated in accordance with the following Expression is greater than or equal to "0", the point of intersection between the equation of a line expressing the image end and the equation of an ellipse expressing the virtual fingerprint range exists, and if the determination value D is negative, the point of intersection between the equation of a line expressing the image end and the equation of an ellipse expressing the virtual fingerprint range does not exist.

$$D=r_x^2\sin^2(d-p)+r_y^2\cos^2(d-p)-[(x_0-c_x)\sin d-(y_0-c_y)\cos d]^2 \quad (3)$$

Until the upper end or the lower end of the virtual existence range of the vein pattern comes into contact with the upper end or the lower end of the imaging range of the vein sensor 42, the position determination unit 12 continues to virtually move the hand in the longitudinal direction by a predetermined minute distance. In addition, every time the hand is moved by the minute distance, the position determination unit 12 determines whether or not the virtual fingerprint range of each finger falls inside the imaging range of the fingerprint sensor 41. In addition, when the virtual fingerprint range of each finger falls inside the imaging range of the fingerprint sensor 41, the position determination unit 12 determines that it is possible to adequately locate the hand only by moving the hand. In addition, the position determination unit 12 causes the display unit 2 to display a guidance message instructing that the hand of the user is to be moved in the longitudinal direction by the sum of distances by which the hand has been virtually moved.

In addition, when a portion of the vein pattern falls outside the lower end of the imaging range of the vein sensor 42 and the whole fingerprint of each finger falls inside the imaging range of the fingerprint sensor 41, the position determination unit 12 virtually moves the hand upward by a distance enough for the virtual vein range to fall inside the imaging range of the vein sensor 42. In addition, in the same way as described above, the position determination unit 12 obtains the virtual fingerprint range of each finger, and when the virtual fingerprint range falls inside the imaging range of the fingerprint sensor 41, the position determination unit 12 determines that it is possible to adequately locate the hand only by moving the hand of the user. In this case, the position determination unit 12 causes the display unit 2 to display a guidance message instructing that the hand of the user is to be moved upward (namely, to the tip side of the finger) by a distance by which the hand has been virtually moved.

On the other hand, even if the upper end or the lower end of the virtual existence range of the vein pattern comes into contact with the upper end or the lower end of the imaging range of the vein sensor 42, when the virtual fingerprint range of one finger does not fall inside the imaging range of the fingerprint sensor, the position determination unit 12 determines that the hand is not adequately located even if the hand is moved. In this case, as described above, the position determination unit 12 determines whether or not the hand of the user is adequately located by moving the wavy guide.

Next, the detail of the determination of whether or not the hand of the user is adequately located by moving the wavy guide will be described.

Figure 11:
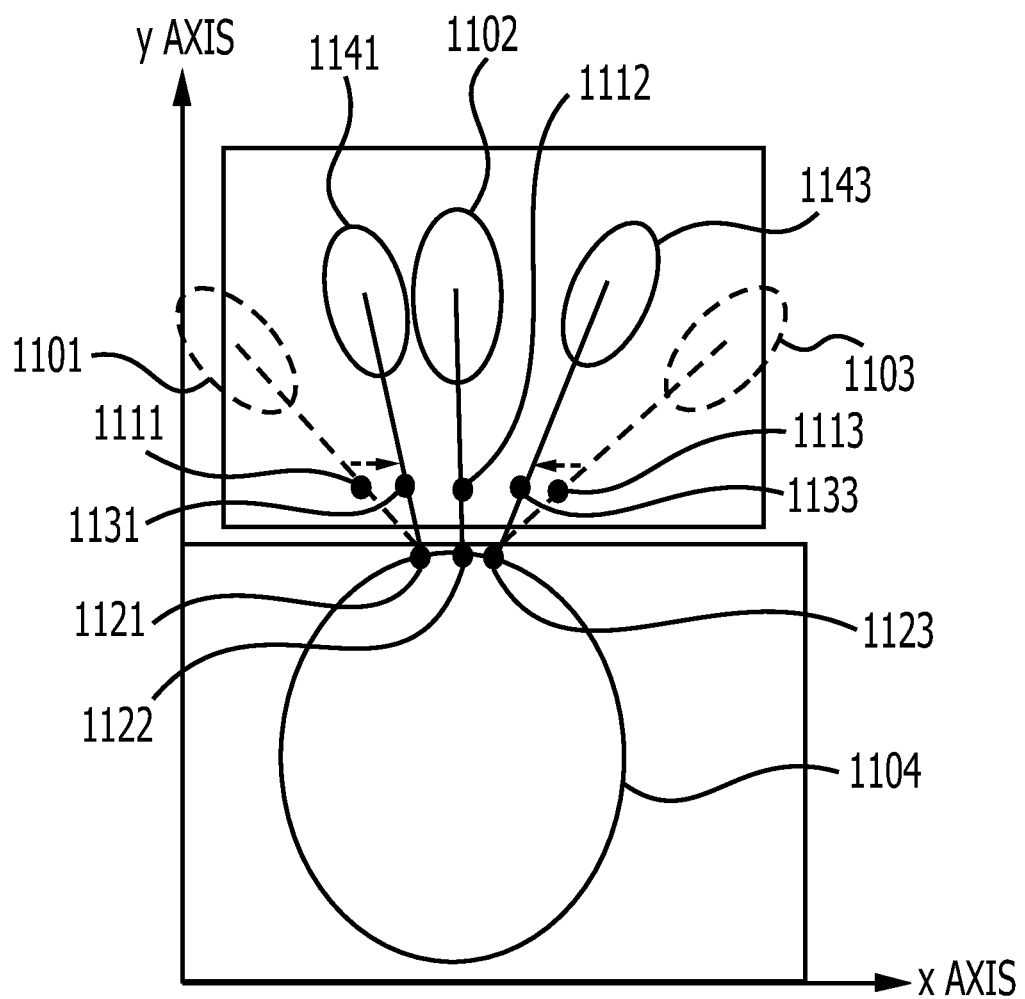
FIG. 11 is a diagram illustrating another example of the positional relationship among the wavy guide, the existence range of the fingerprint, and the existence range of the vein pattern.

FIG. 11 is a diagram illustrating another example of the positional relationship among the wavy guides, the existence range of the fingerprint, and the existence range of the vein pattern. Ellipses 1101 to 1104 indicate the existence ranges of the fingerprints of the index finger, the middle finger, and the annular finger and the existence range of the vein pattern, respectively. In addition, points 1111 to 1113 are fixed points serving as the points of intersection between a line joining the midpoint of the wavy guide 481a to the midpoint of the wavy guide 481b and the center lines of the fingers, respectively. In addition, points 1121 to 1123 are the rotation axes of the index finger, the middle finger, and the annular finger, respectively.

It is assumed that the wavy guides 481a and 481b are moved so that a distance between the wavy guides 481a and 481b becomes short. It is assumed that, in conjunction with this, the hand of the user is virtually moved so that the fixed point 1111 is moved to a point 1131 and the fixed point 1113 is moved to a point 1133. In this case, since the rotation axes 1121 to 1123 are not moved, the existence range of the fingerprint of each finger is also moved along a circular arc whose center is the rotation axis, and as a result, the virtual fingerprint range of the index finger turns out to be an ellipse 1141, the virtual fingerprint range of the annular finger turns out to be an ellipse 1143. In this way, even if the existence range of the fingerprint of one of the fingers falls outside the imaging range of the fingerprint sensor, distances between the existence ranges of the fingerprints of the individual fingers become short by moving the wavy guide, and the existence range of the fingerprint of each finger falls inside the imaging range of the fingerprint sensor, in some case.

In the present embodiment, the wavy guide is movable only in the lateral direction, namely, the width direction of the finger. Therefore, the position determination unit 12 estimates the virtual fingerprint range of each finger when the wavy guide has been virtually moved in the lateral direction by a predetermined distance, as follows.

The position determination unit 12 moves the position of the fixed point of each finger in the lateral direction by a predetermined minute distance (for example, 1 mm) in line with the movement of the wavy guide. For example, when the wavy guides 481*a* and 481*b* are moved so that a distance between the wavy guide 481*a* and the wavy guide 481*b* is narrowed by that minute distance, a distance between the fixed point of the index finger and the fixed point of the annular finger is also narrowed by that minute distance. In addition, ever finger, the position determination unit 12 defines, as the weighted center of the existence range of the fingerprint after movement, the ending point of a line segment, the line segment being drawn through the fixed point with the position of the rotation axis after movement as a starting point and having the same length as that of a line segment extending from the rotation axis to the weighted center of the existence range of the fingerprint before the hand has been virtually moved.

In addition, in this case, the position of the existence range of the vein pattern is not changed.

The position determination unit 12 continues to virtually move each wavy guide in the lateral direction by a predetermined minute distance, within the movable range of each wavy guide. In addition, every time the wavy guide is moved by the minute distance, the position determination unit 12 determines whether or not the virtual fingerprint range of each finger falls inside the imaging range of the fingerprint sensor. In addition, the position determination unit 12 may also virtually move each wavy guide so that a distance between the two wavy guides is narrowed, or may also virtually move the two wavy guides in a same direction. In addition, when the virtual fingerprint range of each finger falls inside the imaging range of the fingerprint sensor, the position determination unit 12 determines that it is possible to adequately locate the hand only by moving the wavy guide. In addition, the position determination unit 12 notifies the guide controller 13 of the sum of distances by which the wavy guide has been virtually moved and the moving direction of the wavy guide.

On the other hand, even if the position of the wavy guide is changed within the movable range of each wavy guide, when the virtual fingerprint range of one finger does not fall inside the imaging range of the fingerprint sensor, the position determination unit 12 determines that the hand is not adequately located even if the wavy guide is moved. Therefore, as described above, the position determination unit 12 determines whether or not the hand of the user is adequately located by moving both of the hand of the user and the wavy guide.

In this case, in response to virtually moving the hand of the user in the longitudinal direction by the predetermined minute distance, the position determination unit 12 moves the rotation axis of each finger in the longitudinal direction by that minute distance. On the other hand, in response to virtually moving each wavy guide in the lateral direction by the predetermined minute distance, the position determination unit 12 moves the fixed point of each finger in the lateral direction by that minute distance. In addition, ever finger, the position determination unit 12 defines, as the weighted center of the existence range of the fingerprint after movement, the ending point of a line segment, the line segment being drawn through the fixed point after movement with the position of the rotation axis after movement as a starting point and having the same length as that of a line segment extending from the rotation axis to the weighted center of the existence range of the fingerprint before the hand has been virtually moved.

Until the upper end or the lower end of the virtual existence range of the vein pattern comes into contact with the upper end or the lower end of the imaging range of the vein sensor, the position determination unit 12 continues to virtually move the hand in the longitudinal direction by a predetermined minute distance. In addition, the position determination unit 12 continues to virtually move each wavy guide in the lateral direction by a predetermined minute distance, within the movable range of each wavy guide. In addition, every time the hand or the wavy guide is moved by that minute distance, the position determination unit 12 determines whether or not the virtual fingerprint range of each finger falls inside the imaging range of the fingerprint sensor. In addition, when the virtual fingerprint range of each finger falls inside the imaging range of the fingerprint sensor, the position determination unit 12 determines that it is possible to adequately locate the hand by moving both of the wavy guide and the hand. In addition, the position determination unit 12 causes the display unit 2 to display a guidance message instructing that the hand of the user is to be moved in the longitudinal direction by the sum of distances by which the hand has been virtually moved. In addition, the position determination unit 12 notifies the guide controller 13 of the sum of distances by which the wavy guide has been virtually moved and the moving direction of the wavy guide.

On the other hand, even if the upper end or the lower end of the virtual existence range of the vein pattern comes into contact with the upper end or the lower end of the imaging range of the vein sensor 42 or the wavy guide is moved in any way, the virtual fingerprint range of one finger does not fall inside the imaging range of the fingerprint sensor, in some cases. For example, owing the large size of the hand of the user, the fingerprint of one finger is located on an upper side, compared with the upper end of the imaging range of the sensor 41, and the lower end of the vein pattern of the palm is located on a lower side, compared with the lower end of the imaging range of the vein sensor 42, in some cases. In such a case, the position determination unit 12 determines that it is difficult to adequately dispose the hand of the user. In addition, the position determination unit 12 sets the out-of-range flag.

According to this second embodiment, on the basis of a positional relationship among the wavy guide, the imaging range of each sensor, and the existence ranges of the fingerprint and the vein, the biometric authentication device estimates the existence ranges of the fingerprint and the vein when the hand of the user or the wavy guide has been virtually moved. Therefore, when a portion of the fingerprint of one finger of the user is not captured in the biological image, this biometric authentication device preferably determines whether or not it is possible to dispose the hand in an adequate position by moving the wavy guide or the hand of the user.

In addition, according to an example of a modification, in place of the above-mentioned wavy guides, the guide mechanism may also include two guides formed so that the cross-section thereof in the lateral direction is concave downward so as to follow a finger pad.

Figure 12A:
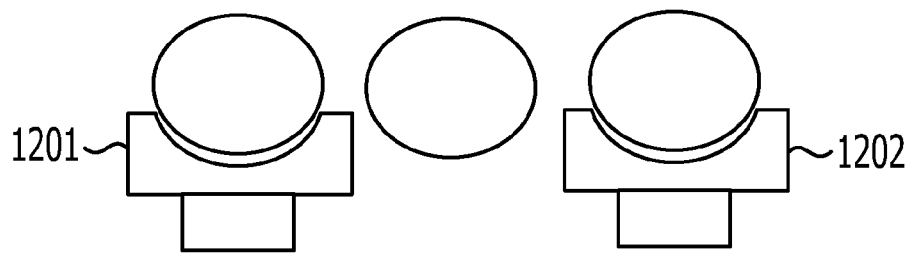
FIG. 12A is a schematic side view of a guiding member according to an example of a modification, viewed from a tip side of a finger.
Figure 12B:
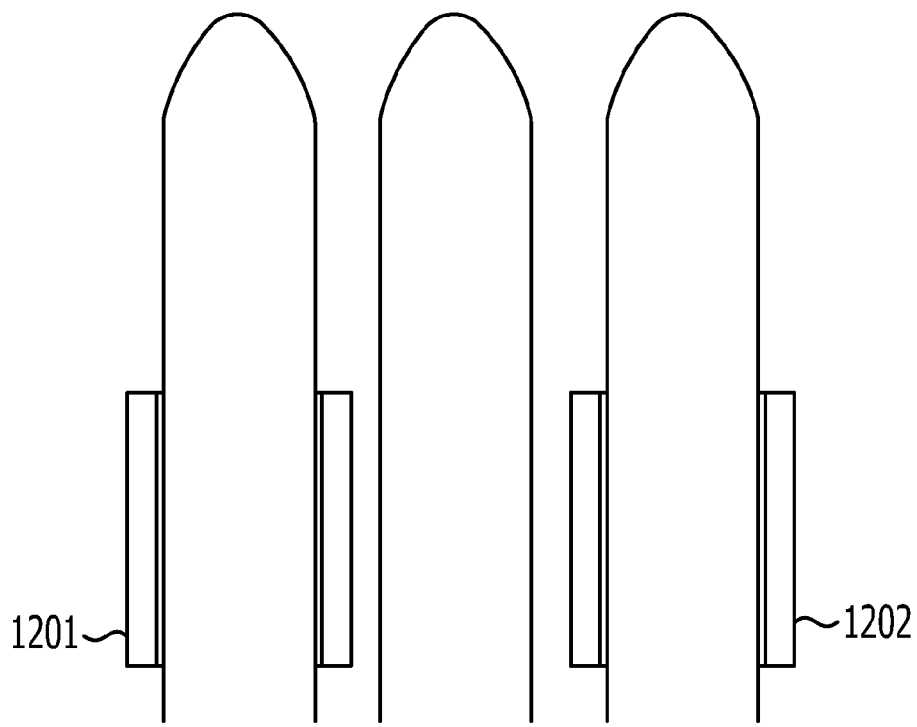
FIG. 12B is a schematic plan view of the guiding member according to an example of a modification.

FIG. 12A is the schematic side view of the guiding member according to this example of a modification, viewed from the tip side of a finger, and FIG. 12B is the schematic plan view of the guiding member according to this example of a modification. Two guiding members 1201 and 1202 are disposed side by side in the lateral direction so that the index finger is placed on one of the two guiding members 1201 and 1202 and the annular finger on the other thereof. In this case, since it is possible to fix the index finger and the annular finger, the guiding members 1201 and 1202 are moved, and hence the index finger and the annular finger are also moved by the same displacement amounts as the displacement amounts of the guiding members. Therefore, when the hand of the user is adequately located by adjusting the position of the guiding member, it is possible for the biometric authentication device to desirably dispose the hand of the user in an adequate position.

Furthermore, according to another example of a modification, the guide mechanism of the biological information acquisition unit may not include a stepping motor used for automatically moving the guiding member. In this case, the guiding member is also moved in response to the movement of the hand of the user. In addition, when having determined that it is possible to adequately locate the hand of the user by moving the guiding member by a predetermined distance, the position determination unit notifies the user of the moving direction of the guiding member and the predetermined distance, through the display unit.

Furthermore, according to another example of a modification, the guiding member of the biological information acquisition unit may also be disposed on the tip side of a finger and held so as to be movable along the longitudinal direction. According to this example of a modification, the user places the hand so that the tip of the finger comes into contact with the guiding member. Also in this case, on the basis of the ridge line area detected from the first biological image and the vein area detected from the second biological image, the position determination unit determines whether or not the hand is adequately located. In addition, when the hand is not adequately located, the position determination unit obtains the moving direction of the hand and the moving direction of the guiding member, used for adequately disposing the hand, on the basis of a positional relationship among the guiding member, the ridge line area, and the vein area.

In addition, according to another example of a modification, the images of the biological information of the finger and the biological information of the palm may also be taken using one image sensor. In this case, for example, the half area of the imaging range of the image sensor, located on the tip side of the finger, corresponds to the imaging range of the biological information of the finger and the other area of the imaging range of the image sensor corresponds to the imaging range of the biological information of the palm.

The biometric authentication device according to any one of the above-mentioned embodiments and examples of a modification thereto may be used for various purposes such as a computer system and an entrance-to-room management system.

Figure 13:
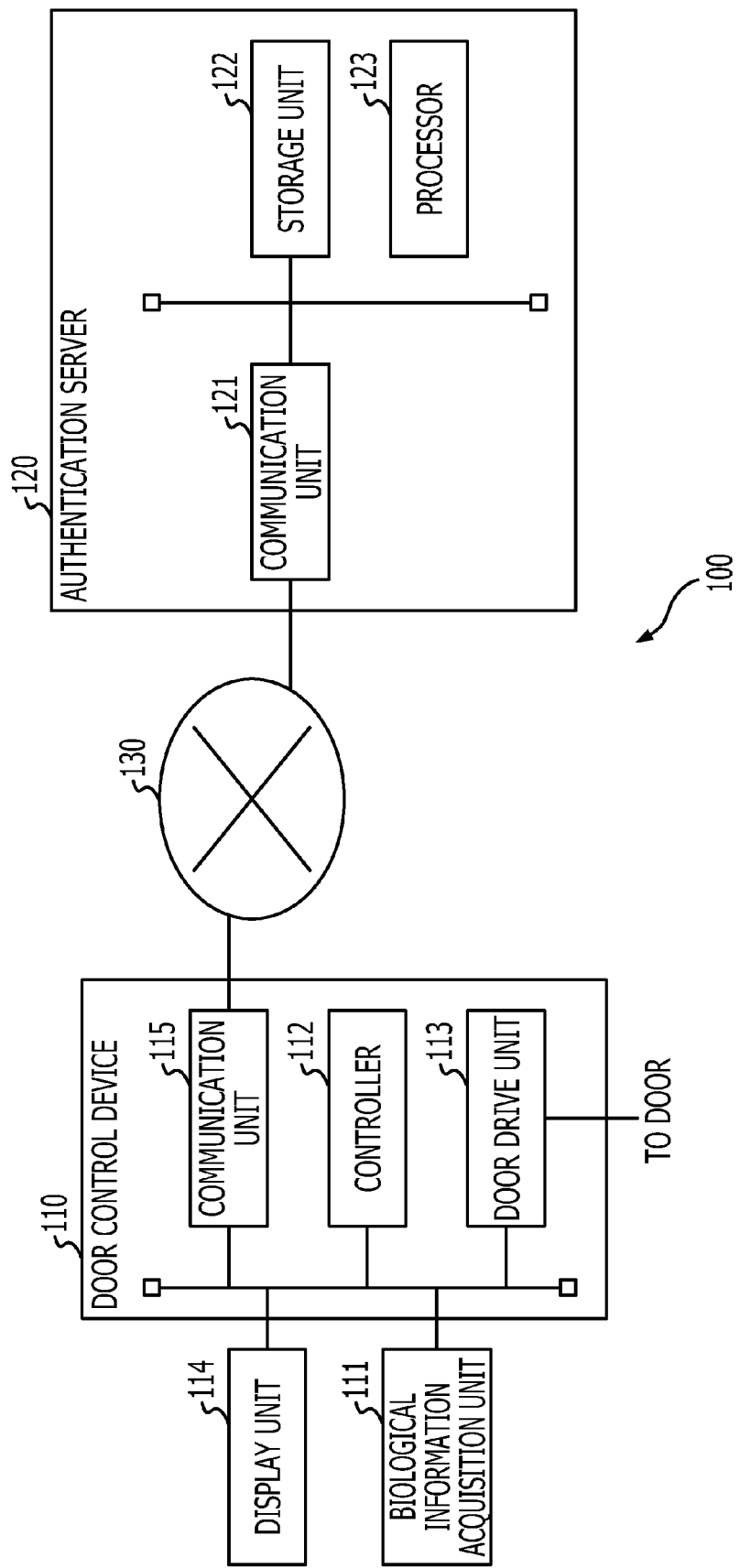
FIG. 13 is a schematic configuration diagram of an entrance-to-room management system in which the biometric authentication device according to one of the embodiments or an example of a modification thereto is implemented.

FIG. 13 is the schematic configuration diagram of an entrance-to-room management system in which the biometric authentication device according to one of the above-mentioned embodiments and examples of a modification thereto is implemented. An entrance-to-room management system 100 includes a door control device 110 and an authentication server 120. The door control device 110 and the authentication server 120 are connected to each other through a communication network 130. The door control device 110 is a device controlling the opening and closing of a door (not illustrated) installed in the entrance of a predetermined section (for example, the entrance of an office room or a building). The door control device 110 includes a biological information acquisition unit 111, a controller 112, a door drive unit 113, a display unit 114, and a communication unit 115.

The biological information acquisition unit 111 may correspond to the biological information acquisition unit of the biometric authentication device according to one of the above-mentioned embodiments and examples of a modification thereto. In addition, the biological information acquisition unit 111 sends, to the controller 112, the first biological image in which the fingerprint is captured and the second biological image in which the vein pattern of the palm is captured.

The controller 112 includes one processor or a plurality of processors, a volatile or non-volatile semiconductor memory, and a peripheral circuit. In addition, the controller 112 includes the object area detection unit, the position determination unit, the guide controller, and the matching-use data generation unit, included in the processor of the biometric authentication device according to one of the above-mentioned embodiments and examples of a modification thereto. Each of these units included in the controller 112 is a functional module realized by a program executed on the processor included in the controller 112. In addition, the controller 112 detects a ridge line area and a vein area from individual biological images using the object area detection unit. In addition, using the position determination unit, on the basis of the ridge line area and the vein area, the controller 112 determines whether or not the hand of the user is adequately located. In addition, when the hand of the user is not adequately located, the controller 112 causes the display unit 114 to display a guidance message instructing the calibration of the position of the hand, or adjusts the position of the guiding member included in the biological information acquisition unit 111, through the guide controller.

In addition, when the hand of the user is adequately located, the controller 112 generates matching-use data from the first and second biological images, using the matching-use data generation unit. In addition, the controller 112 transmits the matching-use data to the authentication server 120 through the communication unit 115.

Furthermore, when, from the authentication server 120, having been notified that the used has been authenticated, the controller 112 notifies the door drive unit 113 of an instruction for opening the door. In addition, when, from the authentication server 120, having been notified that the used has not been authenticated, the controller 112 causes the display unit 114 to display a message indicating the failure of authentication.

The door drive unit 113 is a circuit for generating a drive signal for opening the door or a drive signal for closing the door, in response to a control signal from the controller 112. In addition, by sending the drive signal to the door, the door drive unit 113 causes the door to be opened or closed.

For example, the display unit 114 includes a liquid crystal display. In addition, the display unit 114 displays the message received from the controller 112.

The communication unit 115 includes an interface circuit for connecting the door control device 110 and the authentication server 120 to each other so that the door control device 110 and the authentication server 120 can communication with each other. In addition, the communication unit 115 transmits the matching-use data received from the controller 111 to the authentication server 120. In addition, the communication unit 115 receives, from the authentication server 120, a signal indicating whether or not the user has been authenticated, and provides the signal to the controller 111.

On the basis of the matching-use data received from the door control device 110 and the matching-use data of a registered user stored in a storage unit 122, the authentication server 120 performs biometric authentication processing, and determines whether or not the user is to be authenticated.

Therefore, the authentication server 120 includes a communication unit 121, the storage unit 122, and a processor 123.

The communication unit 121 includes an interface circuit for connecting the authentication server 120 and the door control device 110 to each other so that the authentication server 120 and the door control device 110 can communication with each other. In addition, the communication unit 121 transmits the matching-use data received from the door control device 110 to the processor 123. In addition, the communication unit 121 receives, from the processor 123, a signal indicating whether or not the user has been authenticated, and provides the signal to the door control device 110.

The storage unit 122 includes at least one of a semiconductor memory, a magnetic recording device, and optical recording device. In addition, along with the identification information of one registered user or more, the storage unit 122 stores therein the matching-use data of the registered user. In addition, the storage unit 122 stores therein a program to be executed in the processor 123 and various kinds of data to be used in the program.

The processor 123 includes at least one processor, a volatile or non-volatile semiconductor memory, and a peripheral circuit. In addition, the processor 123 includes the matching unit, the authentication determination unit, and the registration unit, included in the processor of the biometric authentication device according to one of the above-mentioned embodiments and examples of a modification thereto. Each of these units included in the processor 123 is a functional module realized by a program executed on the processor included in the processor 123.

Using the matching unit, on the basis of the matching-use data of the user and the matching-use data of the registered user, the processor 123 obtains the degrees of similarity between the fingerprint and the vein pattern of the user and the fingerprint and the vein pattern of the registered user. In addition, using the authentication determination unit, on the basis of the degrees of similarity, the processor 123 determines whether or not the user is to be authenticated, and transmits a signal indicating the authentication result, to the door control device 110 through the communication unit 121.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A biometric authentication device determining whether or not a user is to be authenticated, by matching biological information of a finger of the user and biological information of a palm thereof against biological information of a finger of a registered user and biological information of a palm thereof, the biometric authentication device comprising:

a first sensor configured to generate a first biological image in which the biological information of the finger of the user is captured;

a second sensor configured to generate a second biological image in which the biological information of the palm of the user is captured;

a guiding member configured to regulate a position of the finger of the user;

a processor; and a memory which stores a plurality of instructions, which when executed by the processor, cause the processor to execute:

detecting a first object area in which the biological information of the finger is captured on the first biological image; and determining, on the basis of the first object area, whether or not at least a portion of the biological information of the finger falls outside an imaging range of the first sensor, and obtain, on the basis of a positional relationship between the guiding member and the biological information of the finger estimated from the first object area, a moving direction of a hand of the user, used for causing the biological information of the finger to fall inside the imaging range of the first sensor and causing the biological information of the palm to fall inside an imaging range of the second sensor, when at least a portion of the biological information of the finger falls outside the imaging range of the first sensor, wherein the processor detects a second object area in which the biological information of the palm is captured on the second biological image;

the processor determines, on the basis of the second object area, whether or not at least a portion of the biological information of the palm falls outside the imaging range of the second sensor, and obtains, on the basis of a relationship among a position of the guiding member, a position of the biological information of the finger estimated from the first object area, and a position of the biological information of the palm estimated from the second object area, the moving direction of the hand of the user, used for causing the biological information of the finger to fall inside the imaging range of the first sensor and causing the biological information of the palm to fall inside the imaging range of the second sensor, when at least a portion of the biological information of the palm falls outside the imaging range of the second sensor; and when at least a portion of the biological information of the finger falls outside the imaging range of the first sensor, the processor estimates, from the first object area, an existence range within which the biological information of the finger exists, by approximating using a shape circumscribing the biological information of the finger, and obtains a virtual position of the existence range when the hand of the user is virtually moved by a predetermined distance along a direction regulated by the guiding member, when a whole existence range of the biological information of the finger in the virtual position falls inside the imaging range of the first sensor, the processor determines that the biological information of the finger falls inside the imaging range of the first sensor, and when the second object area falls inside the imaging range of the second sensor even if the second object area is virtually moved by the predetermined distance along a direction regulated by the guiding member, the processor presents, to the user through a display unit, the direction regulated by the guiding member as the moving direction of the hand of the user.

2. The biometric authentication device according to claim 1,
wherein the guiding member is disposed between the imaging range of the first sensor and the imaging range of the second sensor.

3. The biometric authentication device according to claim 2,
wherein the guiding member includes a first member and a second member, disposed so as to sandwich therebetween one finger of the user.

4. The biometric authentication device according to claim 3,
wherein the guiding member is movable along a width direction of the finger of the user, and
wherein when at least a portion of the biological information of the finger falls outside the imaging range of the first sensor, the processor obtains a virtual position of the existence range when the guiding member is virtually moved by a predetermined distance along the width direction of the finger, and when the whole existence range of the biological information of the finger in the virtual position falls inside the imaging range of the first sensor, the processor determines that the biological information of the finger falls inside the imaging range of the first sensor, and defines a moving direction of the guiding member as the moving direction of the hand of the user.

5. The biometric authentication device according to claim 4, further comprising:
a guide controller configured to move the guiding member by a predetermined distance along the width direction of the finger in a case where, when the guiding member is virtually moved by the predetermined distance by the processor along the width direction of the finger, it is determined that the biological information of the finger falls inside the imaging range of the first sensor.

6. A method for adjusting a position of a hand of a user, performed in a biometric authentication device determining whether or not the user is to be authenticated, by matching biological information of a finger of the user and biological information of a palm thereof against biological information of a finger of a registered user and biological information of a palm thereof, the method comprising:
detecting, by a processor, a first object area in which the biological information of the finger is captured, on a first biological image in which the biological information of the finger of the user is captured, the first biological image being generated by a first sensor; and
obtaining, on the basis of a positional relationship between a guiding member regulating a position of the finger of the user and the biological information of the finger estimated from the first object area, a moving direction of a hand of the user, used for causing the biological information of the finger to fall inside an imaging range of the first sensor and causing the biological information of the palm to fall inside an imaging range of the second sensor, when it is determined, on the basis of the first object area, whether or not at least a portion of the biological information of the finger falls outside the imaging range of the first sensor, and at least a portion of the biological information of the finger falls outside the imaging range of the first sensor, wherein
the detecting detects a second object area in which the biological information of the palm is captured on the second biological image; and
the obtaining determines, on the basis of the second object area, whether or not at least a portion of the biological information of the palm falls outside the imaging range of the second sensor, and when at least a portion of the biological information of the palm falls outside the imaging range of the second sensor, the obtaining obtains, on the basis of a relationship among a position of the guiding member, a position of the biological information of the finger estimated from the first object area, and a position of the biological information of the palm estimated from the second object area, the moving direction of the hand of the user, used for causing the biological information of the finger to fall inside the imaging range of the first sensor and causing the biological information of the palm to fall inside the imaging range of the second sensor; and
when at least a portion of the biological information of the finger falls outside the imaging range of the first sensor, the obtaining estimates, from the first object area, an existence range within which the biological information of the finger exists, by approximating using a shape circumscribing the biological information of the finger, and obtains a virtual position of the existence range when the hand of the user is virtually moved by a predetermined distance along a direction regulated by the guiding member, when a whole existence range of the biological information of the finger in the virtual position falls inside the imaging range of the first sensor, the obtaining determines that the biological information of the finger falls inside the imaging range of the first sensor, and when the second object area falls inside the imaging range of the second sensor even if the second object area is virtually moved by the predetermined distance along a direction regulated by the guiding member, the obtaining presents, to the user through a display unit, the direction regulated by the guiding member as the moving direction of the hand of the user.

* * * * *